United States Patent
Okada

(10) Patent No.: US 6,466,554 B2
(45) Date of Patent: *Oct. 15, 2002

(54) SATELLITE DATA DISTRIBUTION METHOD AND SYSTEM USING A MOBILE COMMUNICATION SYSTEM

(75) Inventor: Yasushi Okada, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,701

(22) Filed: Feb. 26, 1997

(65) Prior Publication Data

US 2002/0080731 A1 Jun. 27, 2002

(30) Foreign Application Priority Data

Sep. 11, 1996 (JP) .............................. 8-240868

(51) Int. Cl.$^7$ .................... H04B 7/185; H04N 7/14
(52) U.S. Cl. ................ 370/312; 370/321; 370/338; 455/3.02; 455/3.03; 725/64; 725/68
(58) Field of Search ................. 370/316, 321, 370/326, 314, 328, 337, 347, 319, 312, 338, 345; 455/11.1, 12.1, 13.1, 3.01, 3.02, 3.03, 3.04, 3.05; 725/63, 64, 65, 66, 67, 68, 70.71

(56) References Cited

U.S. PATENT DOCUMENTS

| | | | | |
|---|---|---|---|---|
| 5,388,101 A | * | 2/1995 | Dinkins | 348/12 |
| 5,392,353 A | * | 2/1995 | Morales | 380/20 |
| 5,455,823 A | * | 10/1995 | Noreen et al. | 370/50 |
| 5,537,406 A | * | 7/1996 | Bringer | 370/77 |
| 5,633,872 A | * | 5/1997 | Dinkins | 370/312 |
| 5,664,006 A | * | 9/1997 | Monte et al. | 455/405 |
| 5,737,330 A | * | 4/1998 | Fulthorp et al. | 370/346 |

FOREIGN PATENT DOCUMENTS

JP 6-253356 9/1994

* cited by examiner

*Primary Examiner*—Alpus H. Hsu
(74) *Attorney, Agent, or Firm*—Katten Muchin Zavis Rosenman

(57) ABSTRACT

A satellite data distribution method and system in which a subscriber can receive a data distribution service via a mobile communication system. The satellite data distribution system includes a mobile communication system having at least one base station unit communicating with the subscribers. The data to be distributed is transmitted from a center station of the satellite data distribution system to a satellite. The data is distributed from the satellite to the base station unit of the mobile communication system. Then, the data is distributed from the base station unit to the subscribers via the mobile communication system. Thus, a satellite data reception unit is not necessarily provided to each of the subscribers.

19 Claims, 33 Drawing Sheets

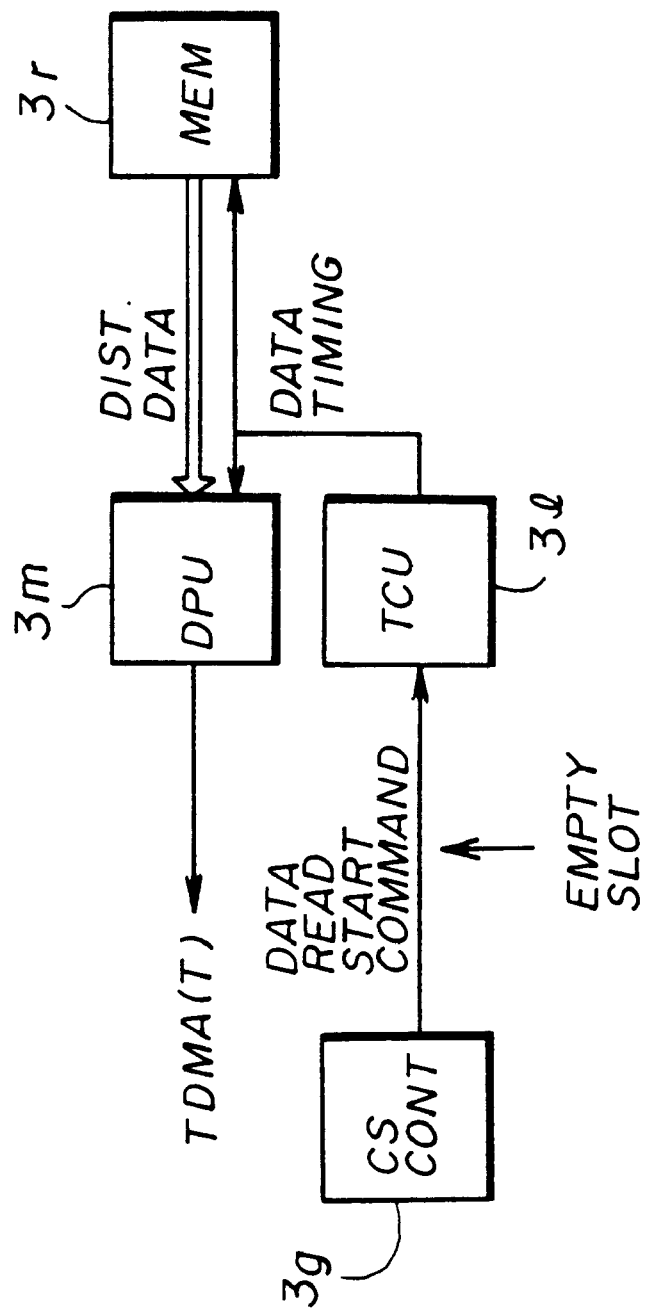

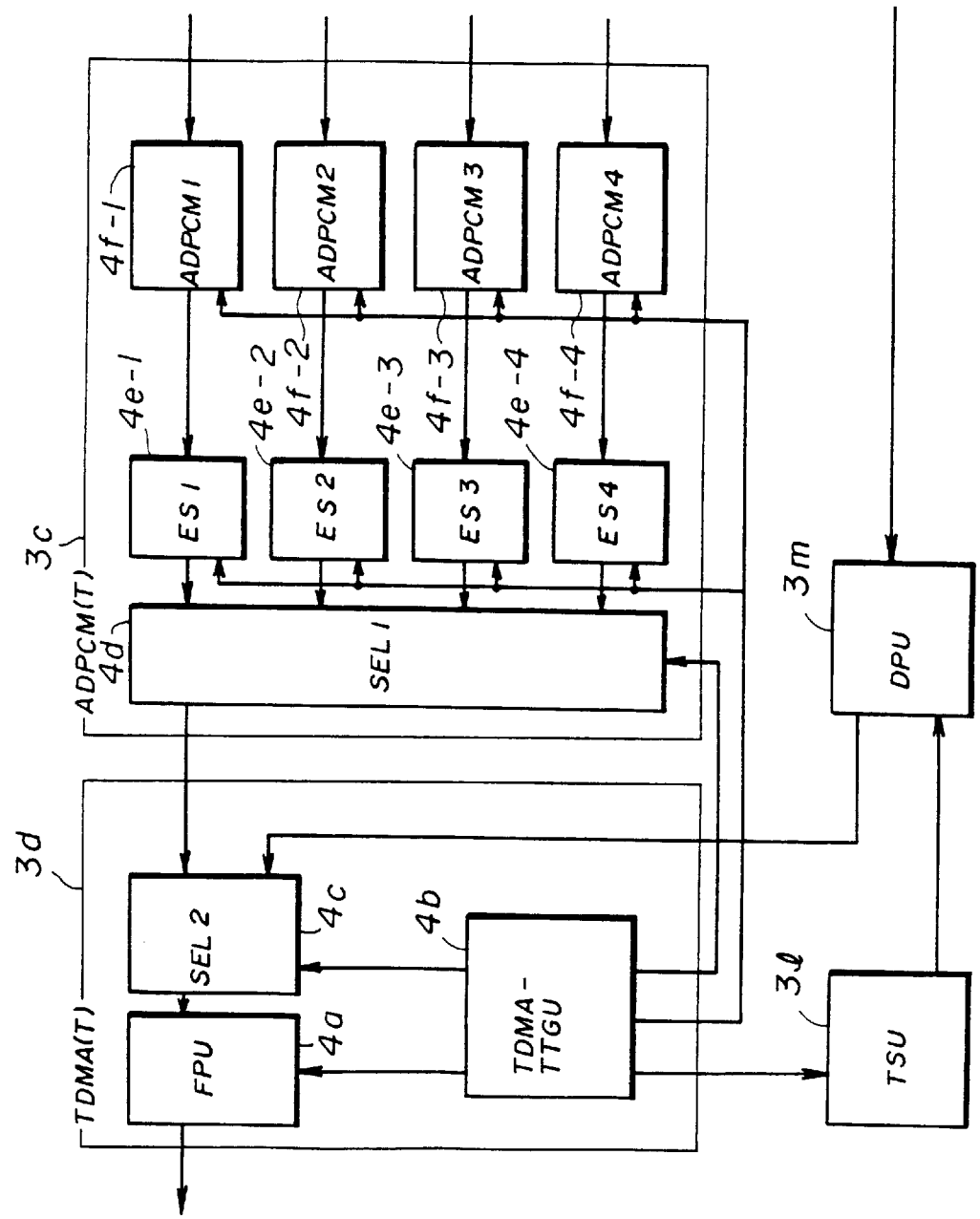

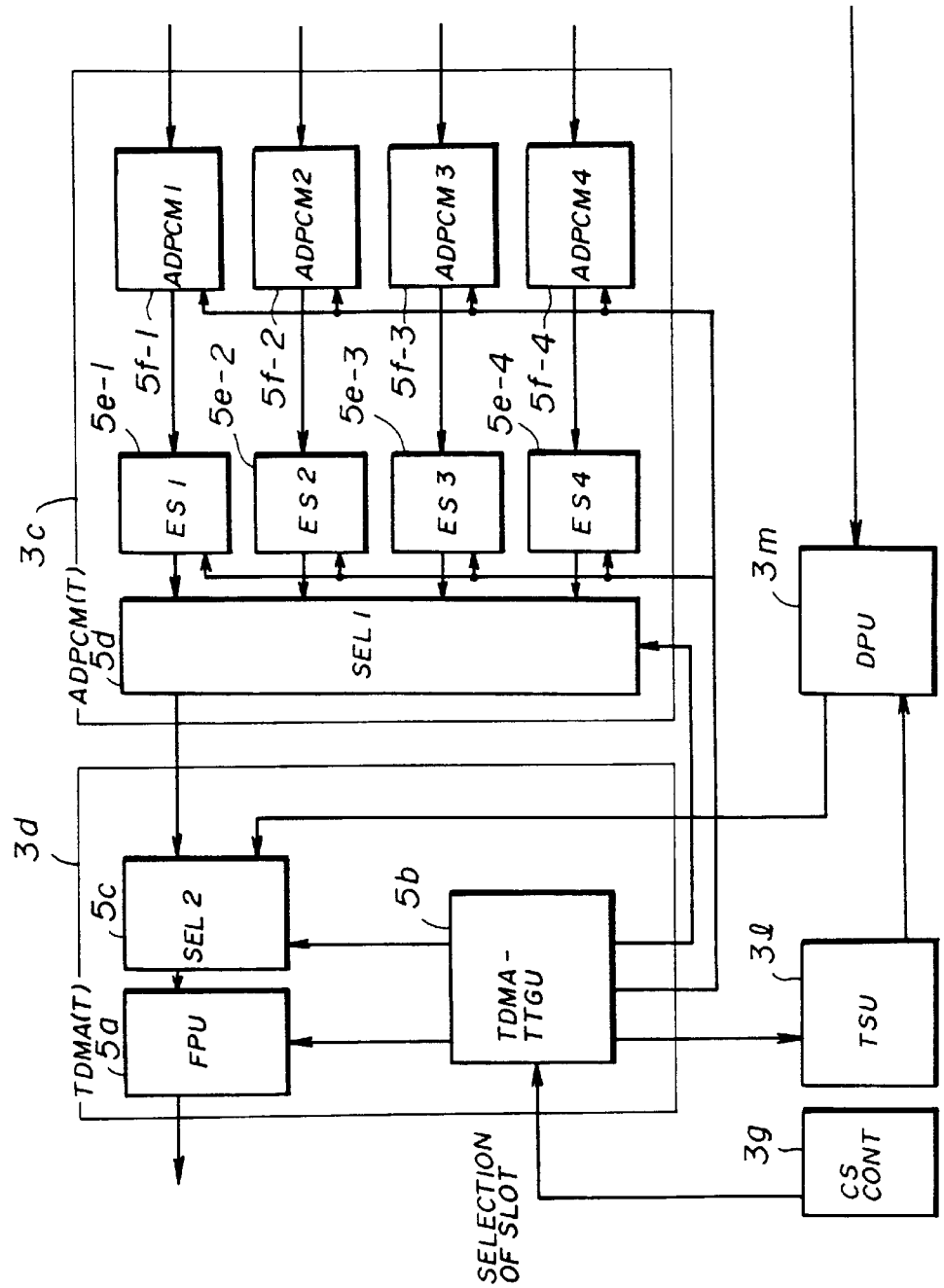

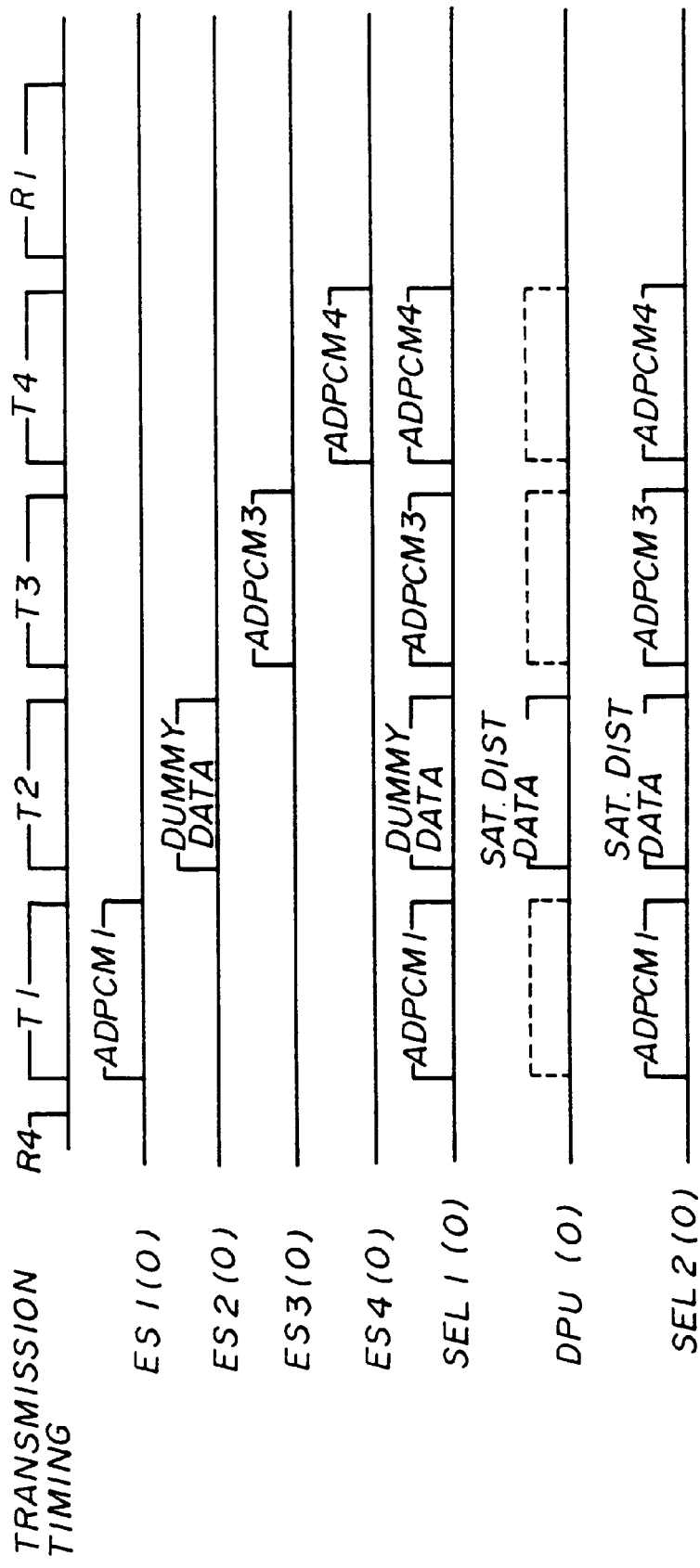

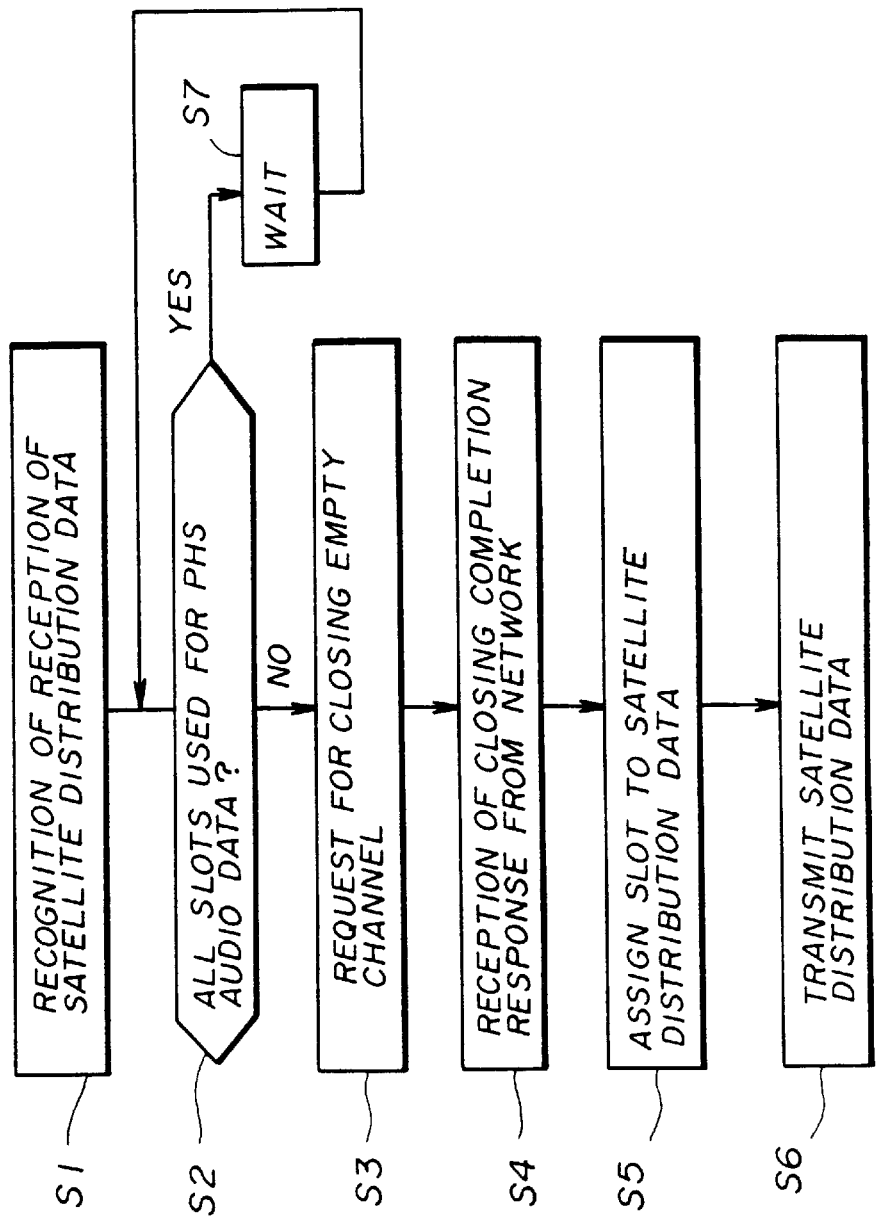

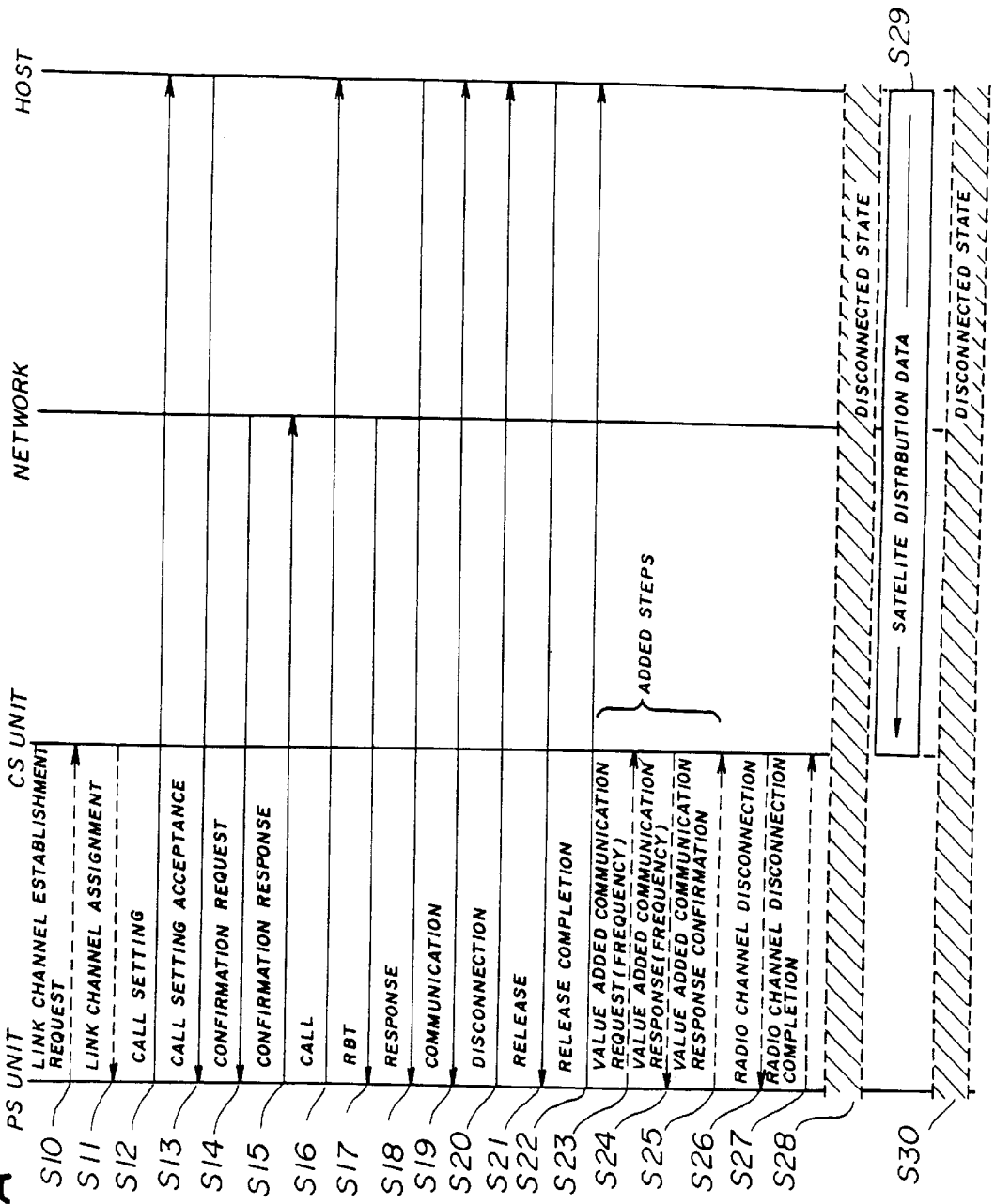

AUDEO DATA SLOT

PACKET DATA SLOT

SATELLITE DATA DISTRIBUTION METHOD AND SYSTEM USING A MOBILE COMMUNICATION SYSTEM

BACKGROUND OF THE INVENTION

1. Field of the Invention

The present invention generally relates to a satellite data distribution method and system using a mobile communication system and, more particularly, to a satellite data distribution method and system for distributing data to a base station of a mobile communication system and subscribers of the mobile communication system substantially at the same time by providing a satellite communication receiver to the base station of the mobile communication system.

The satellite data distribution, which distributes data to a base station of a mobile communication system and subscribers of the mobile communication system substantially at the same time, may be referred to as a remote loading system for a base station of a mobile communication system via a satellite.

2. Description of the Related Art

The satellite data distribution system serves to distribute data to a number of subscribers of the system. The satellite data distribution system has become popular as one of multi-media services. Particularly, the satellite data distribution system has an advantage to distribute data simultaneously over a large area as compared to other data distribution systems such as a cable communication system or a ground area radio communication system.

FIG. 1 is an illustration for explaining a conventional wide area data distribution system using satellite communication. The conventional satellite data distribution system can provide an interactive data distribution service. A host center 10 stores various sets of data including application data, and can transmit a large amount of data to a number of subscriber terminals 20 or to a predetermined subscriber terminal via a satellite 1.

The host center 10 has a satellite antenna such as a parabola antenna or a Cassegrain antenna so as to transmit data to the satellite 1. Each of the subscriber terminals 20 includes a receiver unit and a satellite communication antenna to receive the data transmitted by the satellite 1.

In the procedure of the conventional data distribution service, a subscriber (which corresponds to an individual user or a company) requests a distribution of data to the host center 10 via a ground surface network. The host center 10 responds to the subscriber's request to distribute the requested data to the subscriber. A user of this system can use various services through a personal computer, for example, which is connected to the receiver unit.

However, the above-mentioned conventional data distribution system has a problem in that each of the subscribers must have the satellite communication receiver unit and the satellite communication antenna which requires a relatively large construction. Thus, a company or an individual user cannot easily install the receiver unit and the satellite antenna which is a bottleneck for spreading the data distribution service using a satellite.

SUMMARY OF THE INVENTION

It is a general object of the present invention to provide an improved and useful satellite data distribution method and system in which the above-mentioned problems are eliminated.

A more specific object of the present invention is to provide a satellite data distribution method and system in which a subscriber can receive a data distribution service via a mobile communication system.

Another object of the present invention is to provide a satellite data distribution method and system for efficiently distributing loading data to a plurality of base stations of a mobile communication system via a satellite.

In order to achieve the above-mentioned objects, there is provided according to one aspect of the present invention a satellite data distribution method for distributing data to a plurality of subscribers of a satellite data distribution system via a satellite, the satellite data distribution system including a mobile communication system having at least one base station unit communicating with the subscribers, the satellite data distribution method comprising the steps of:

a) transmitting data to be distributed from a center station of the satellite data distribution system to the satellite;

b) distributing the data from the satellite to the base station unit of the mobile communication system; and c) distributing the data from the base station unit to the subscribers.

According to the above-mentioned invention, the data to be distributed to the subscribers is relayed by the base station unit of the mobile communication system. The data transmitted from the satellite is collectively received by the base station unit, and then the data is distributed to each of the subscribers via the radio communication used in the mobile communication system. Thus, a satellite data reception unit is not necessarily provided to each of the subscribers.

In the satellite data distribution method according to the present invention, the base station unit of the mobile communication system may be connected to the center station via a communication network, and may further comprise the step of:

d) sending a distribution request from one of the subscribers to the center station via the mobile communication network and the communication network, the distribution request requesting distribution of the data.

In the above-mentioned invention, step a) may include the step of:

a-1) transmitting the data from the center station to the base station unit of the mobile communication system via the satellite in response to the distribution request from the one of the subscribers.

Additionally, step d) may comprise the step of:

d-1) sending a closing request to the mobile communication system for requesting closing of a communication channel used for distributing the data while the data is being distributed to the subscribers after the distribution request from one of the subscribers is confirmed in the base station unit.

Thus, the mobile communication network can always recognize available channels which are not used for the satellite distribution data, and thus an effective channel assignment can be performed in the mobile communication system.

In the satellite data distribution method according to the present invention, step d) may comprise the step of:

d-2) setting a reception frequency in the base station unit for receiving the data from the satellite after confirming the distribution request from the subscribers during a communication between the one of the subscribers and the center station.

Step d) may further comprise the step of:

d-3) transferring information from the one of the subscribers to the base station unit, the information including the reception frequency and a subscriber number of the one of the subscribers.

Additionally, step c) may comprise the steps of:

c-1) automatically making a call from the base station unit to the one of the subscribers based on the information transferred in step d-3); and c-2) automatically disconnecting a connection between the base station unit and the one of the subscribers after the data is distributed from the base station unit to the one of the subscribers.

In the above-mentioned invention, the calling operation and disconnecting operation are automatically performed by the base station unit, resulting in reduction in the control operations performed by the mobile communication system.

The satellite distribution method according to the present invention may further comprise the step of:

e) sending to the one of the subscribers a message indicating that a distribution of the data is unable when the data is not received from the satellite within a predetermined time period after the distribution request is sent from the one of the subscribers.

Additionally, there is provided according to another aspect of the present invention a base station unit of a mobile communication system used in a satellite data distribution system distributing data to a plurality of subscribers via a satellite, the base station unit comprising:

a communication processing unit for connecting the subscribers to the mobile communication system;

a satellite data reception unit for receiving the data from the satellite; and a distribution processing unit for distributing the data received by the satellite data reception unit, the data being distributed to the subscribers via the communication processing unit.

Additionally, there is provided according to another aspect of the present invention a base station unit of a mobile communication system used in a satellite data distribution system distributing data to a plurality of subscribers via a satellite, the base station unit comprising:

a communication processing unit for connecting the subscribers to the mobile communication system; and a distribution processing unit connectable to a satellite data reception unit for receiving the data from the satellite, the distribution processing unit distributing the data received by the satellite data reception unit, the data being distributed to the subscribers via the communication processing unit.

According to the above-mentioned invention, the data to be distributed to the subscribers is relayed by the base station unit of the mobile communication system. The data transmitted from the satellite is collectively received by the satellite data reception unit, and then the received data is distributed to each of the subscribers via the distribution processing unit provided in the base station unit of the mobile communication system. Thus, a satellite data reception unit is not necessarily provided to each of the subscribers.

The base station unit may further comprise a data throughput control unit controlling throughput of the data when the data is received by the satellite data reception unit.

Additionally, the communication processing unit may have a channel exclusive for distributing the data received by the satellite data reception unit to the subscribers.

Further, the communication processing unit may comprise a channel assignment control unit for flexibly assigning one of a plurality of communication channels to distribute the data to the subscribers in response to a condition of use of the communication channels.

Additionally, the communication processing unit may comprise a channel control unit which sends a close request for closing one of a plurality of communication channels used for distributing the data while the data is being distributed to the subscribers, the close request being sent to the mobile communication system after a distribution request from one of the subscribers is confirmed, the distribution request requesting distribution of the data to the one of the subscribers.

The communication processing unit may comprise a frequency control unit which sets a reception frequency of the satellite data reception unit upon confirmation of reception of a distribution request during communication between one of the subscribers sending a distribution request and a center station of the satellite data distribution system, the distribution request requesting for distributing the data to the one of the subscribers.

Additionally, the communication processing unit may further comprise a reception control unit which receives information from the one of the subscribers during a communication between the one of the subscribers and the center station of the satellite data communication system, the information including the reception frequency and a subscriber number of the one of the subscribers.

The communication processing unit may further comprise a disconnection control unit which automatically disconnects a connection between the base station unit and the one of the subscribers after distributing the data to the one of the subscribers by automatically calling the one of the subscribers based on the subscriber number included in the information.

The base station unit according to the present invention may further comprise a packet processing unit for converting the data into packet data when the data received from the satellite is transmitted to the subscribers.

Additionally, the base station unit according to the present invention may further comprise a message control unit which sends an unable message to one of the subscribers requesting distribution of the data when the data is not received within a predetermined time period after a distribution request is received from the one of the subscribers, the unable message indicating that the data is not distributed from the base station unit, the distribution request requesting for distribution of the data to the one of the subscribes.

Additionally, there is provided according to another aspect of the present invention a satellite data reception unit provided in a base station unit of a mobile communication system used in a satellite data distribution system distributing data to a plurality of subscribers via a satellite, the satellite data reception unit comprising:

a data reception unit for receiving the data transmitted from the satellite; and an interfacing unit for connecting the satellite data reception unit to a communication processing unit provided in the base station unit so as to connect the subscribers to the mobile communication system.

According to the above-mentioned invention, the data to be distributed to the subscribers is relayed by the base station unit of the mobile communication system. The data transmitted from the satellite is collectively received by the satellite data reception unit, and then the received data is distributed to each of the subscribers via the communication processing unit through the mobile communication system. Thus, a satellite data reception unit is not necessarily provided to each of the subscribers.

The satellite data reception unit according to the present invention may further comprise a data throughput control unit for controlling a throughput of the data when the data is received by the satellite data reception unit.

Additionally, the satellite data reception unit may further comprise a data storing unit for storing the data.

Further, the satellite data reception unit may further comprise a comparing unit for comparing a first subscriber number included in the data with a second subscriber number stored in the satellite data reception unit, the second subscriber number being included in information received from one of the subscribes sending a distribution request for requesting distribution of the data to the one of the subscribers, distribution of the data to the one of the subscribers being determined as a result of comparison performed by the comparing unit.

Additionally, there is provided according to another aspect of the present invention a mobile terminal unit of a mobile communication system adapted to be used with a satellite data distribution system distributing data to a plurality of subscribers via a satellite, the mobile terminal unit comprising:

- a communication processing unit for communicating with a base station unit of the mobile communication system; and
- a control unit for controlling a communication between the communication processing unit and a center station of the satellite data distribution system transmitting the data to the satellite, the control unit controlling transmission of a distribution request to be sent to the center station for requesting distribution of the data to the subscribers, the control unit further controlling an announcement of transfer of a reception frequency to the base station during the communication.

According to the above-mentioned invention, each of the subscribers is provided with the mobile terminal unit. One of the subscribers can request distribution of the data via the mobile terminal unit and the mobile communication system. The data requested by the one of the subscribers is transmitted from the center station to the satellite, and then the data is distributed to the subscribers via the base station unit of the mobile communication system. That is, the data transmitted from the satellite is collectively received by the base station unit, and then the data is distributed to each of the subscribers via the radio communication used in the mobile communication system. Thus, a satellite data reception unit is not necessarily provided to each of the subscribers.

The mobile terminal unit according to the present invention may further comprise:

- a packet processing unit for converting the data into packet data when the data from the satellite is received from the base station; and
- a selection unit for switching between the packet data and regular audio data when a communication is performed between the mobile terminal unit and the base station terminal.

Additionally, there is provided according to another aspect of the present invention a satellite data distribution method for distributing control software data to a plurality of base stations of a mobile communication system used with a satellite data distribution system via a satellite, the satellite data distribution method comprising the steps of:

a) transmitting the control software data from a center station of the satellite data distribution system to the satellite, the control data being used by the base stations so as to control the mobile communication system;

b) distributing the control software data from the satellite to the base stations; and c) downloading the control software data received by the base station.

In the above-mentioned invention, the control software data (application software) can be simultaneously distributed to each of the base station units of the mobile communication system. Thus, the time spent on loading the application software data to the base station units is reduced. A maintenance function is also improved since the communication with each of the base station units is performed via the satellite.

In the satellite data distribution method according to the present invention, step c) may comprise the step of:

c-1) storing the control software data in a memory so that the control software data received from the satellite is stored separately from control software data currently used by the base stations.

The satellite data distribution method according to the present invention may further comprise the step of:

d) switching the currently used control software data to the control software data stored in the memory by sending a switch signal from the center station to the base stations via the satellite so that the currently used control software data is simultaneously switched to the control software data stored in the memory in each of the base stations.

Additionally, there is provided according to another aspect of the present invention a base station unit of a mobile communication system used with a satellite data distribution system, the base station unit using control software data to control the mobile communication system, the base station unit comprising;

- a communication processing unit for connecting the base station unit to the mobile communication system;
- a satellite data reception unit for receiving the data including control software data used for controlling the mobile communication system; and
- a loading unit for loading the control software data received by the satellite data reception unit to the communication processing unit.

In the above-mentioned invention, the control software data (application software) can be simultaneously distributed to each of the base station units of the mobile communication system, and the distributed control software data is loaded to the communication processing unit. Thus, the time spent on loading the control software data to the base station units is reduced. A maintenance function is also improved since the communication with each of the base station units is performed via the satellite.

In the base station unit according to the present invention, the loading unit comprises a first memory and a second memory, the control software data received by the satellite data reception unit being stored in one of the first and second memories so that the control software data stored in the one of the first and second memories is switched to control software data previously stored in the other one of the first and second memories.

Additionally, there is provided according to another aspect of the present invention a processor readable medium having program code instructions stored thereon which when executed by a processor controls an operation of a base station unit of a mobile communication system used with a satellite data distribution system to simultaneously distribute data to a plurality of subscribers via a satellite, the instructions comprising:

communication control program means for causing the processor to connect the subscribers to the mobile communication system;

call connection management program means for causing the processor to automatically call one of the subscribers requesting the data after the base station unit receives the data from the satellite;

satellite data reception control program means for causing the processor to manage a reception of the data from the satellite; and satellite IO managing program means for causing the processor to manage a connection of the satellite data reception unit to the base station, the satellite data reception unit receiving the data from the satellite.

In the processor readable medium according to the present invention, the satellite managing program means may include download reception processing program means for causing the processor to download control software data to a plurality of the base station units.

Additionally, the communication control program means may comprise:

radio IO management program means for causing the processor to manage input/output operations through radio communication;

operating system program means for causing the processor to control an operating system;

application program means for causing the processor to manage an operation with respect to an application; and network management program means for causing the processor to manage a connection to a network.

Other objects, features and advantages of the present invention will become more apparent from the following detailed descriptions when read in conjunction with the accompanying drawings.

BRIEF DESCRIPTION OF THE DRAWINGS

FIG. 4A is an illustration for explaining a connection between a CS unit and a satellite data reception unit shown in FIG. 3;

FIG. 5A is a block diagram of a part of the CS unit;

FIG. 6A is a block diagram of a part of the CS unit;

FIG. 6B is a timing chart of an assignment of the data received from the satellite;

FIG. 7 is a flowchart of a sequence of the slot assignment method shown in FIGS. 6A and 6B.

FIGS. 8A and 8B are parts of a sequence chart of an operation performed by the satellite data distribution system according to the first embodiment of the present invention;

DETAILED DESCRIPTION OF THE PREFERRED EMBODIMENTS

Figure 1:
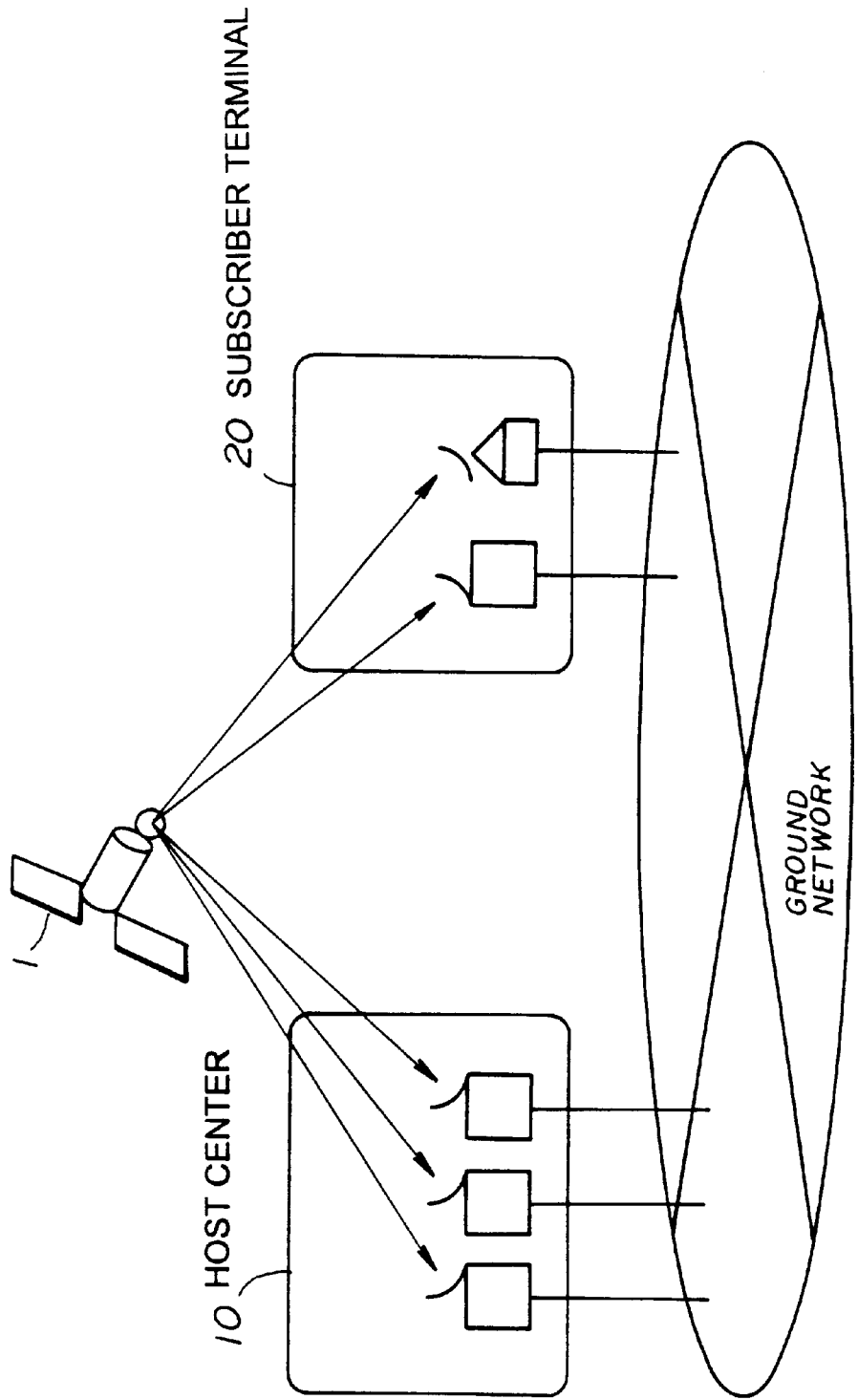
FIG. 1 is an illustration for explaining a conventional wide area data distribution system using a satellite communication.
Figure 2:
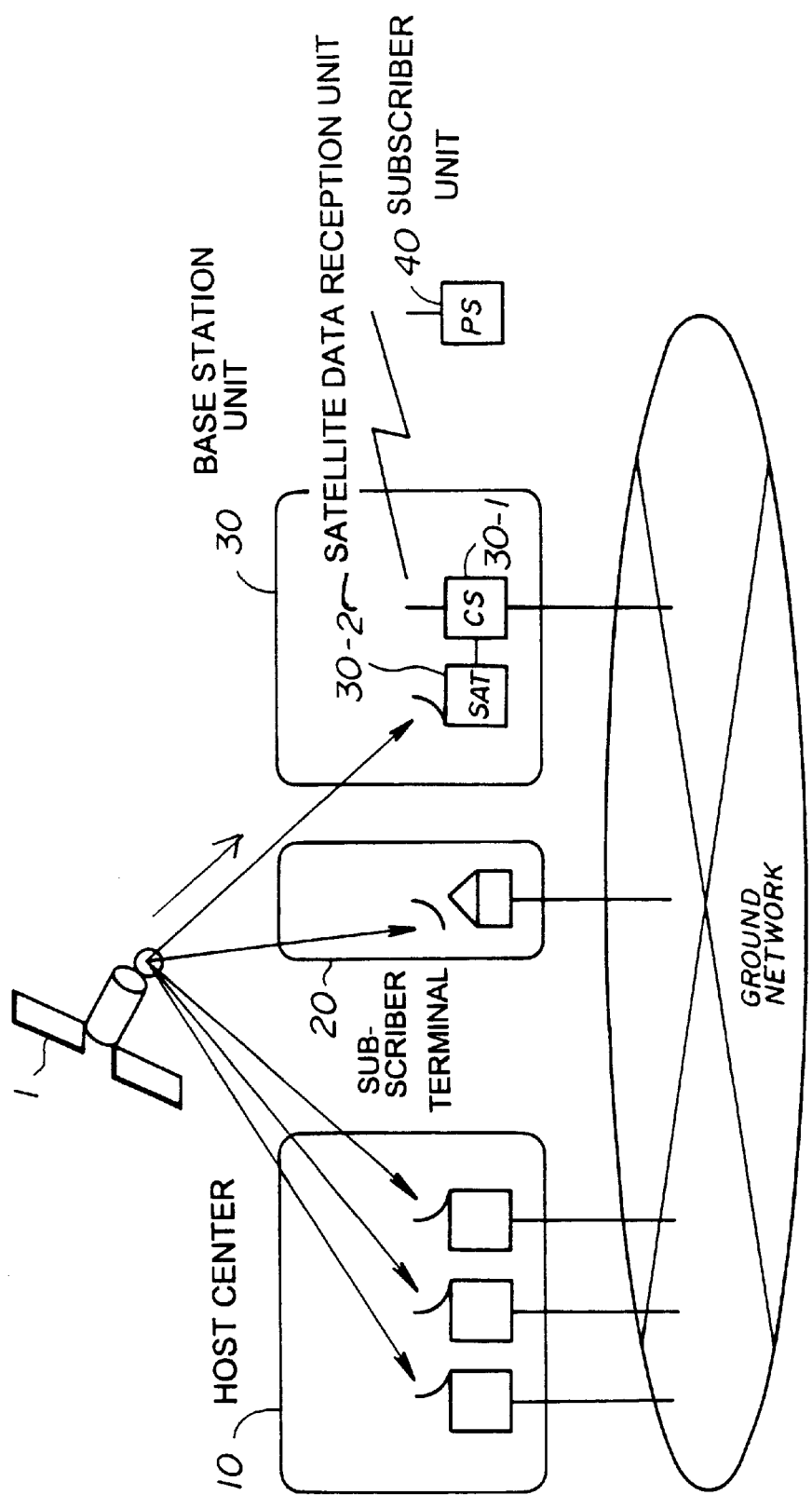
FIG. 2 is an illustration for explaining a principle of a satellite data distribution system according to the present invention.

A description will now be given of a principle of the present invention. FIG. 2 is an illustration for explaining a principle of a satellite data distribution system according to the present invention. In FIG. 2, parts that are the same as the parts shown in FIG. 1 are given the same reference numerals.

The satellite data distribution system shown in FIG. 2 comprises the satellite 1, the host center 10; which distributes data via the satellite 1, and the subscriber terminal 20. The satellite data distribution system according to the present invention further comprises a base station unit 30 of a mobile communication system which receives the data from the satellite 1 and a subscriber unit 40 which receives the data distributed from the satellite through the base station unit 30.

The satellite line used in the satellite data distribution system according to the present invention is a single directional line from the host center 10 to the satellite 1 and consequently from the satellite 1 to the base station unit 30 of the mobile communication system. Accordingly, the present system is a single directional data distribution system.

The base station unit 30 of the mobile communication system is provided with a satellite data reception unit 30-2 for receiving data from the satellite 1 in addition to a regular base station unit for performing a mobile communication. That is, the satellite reception unit and antenna for receiving the data from the satellite 1 are provided to the base station unit 30 and, thus, there is no need to provide the satellite reception unit and antenna to the subscriber unit 40.

The satellite data distribution system according to the present invention is capable of distributing the data to the regular subscriber terminal 20.

The mobile communication system described herein may be a personal handy phone system (PHS), RCR STR-28, which is standardized in Japan. The PHS was developed for a digital cordless telephone system, and is usable either in-house or outside within an area covered by a base station.

The PHS uses a 4-channel time division multiplex access (TDMA (up link)) method. The radio transmission signal comprises a plurality of frames each of which comprises four slots correspond to the four channels. The data rate per single channel is 32 kbps which is a relatively high speed as compared to other mobile communication systems. Additionally, the base station of the PHS has a relatively simple construction as compared to a regular portable telephone system such as STD-27 standardized in Japan or TDMA or CDMA standardized in the United States.

The satellite data distribution system according to the present invention is not limited to use of the PHS, and other mobile communication systems may be used. However, in order to obtain matching with the satellite data and to construct the base station in an economical manner, a mobile communication system is preferred to have a high data rate and simple construction of the base station such as, for example, the PHS in Japan, the personal communication network (PCN) in European countries or the personal communication service (PCS) in the United States.

In PHS, the base station unit 30 is referred to as a connecting station (CS) unit, and the subscriber unit 40 is referred to as a portable station (PS) unit.

The CS unit normally covers an area approximately within a hundred meter radius. Accordingly, a numerous number of CS units are installed along a large road, around a station and in a downtown area. On the other hand, the PS unit is miniaturized similar to a regular cordless phone so as to be fit in a pocket, and transmits a signal with a strength of only a few tens of milliwatts.

The above-mentioned base station unit 30 comprises the CS unit 30-1 and the satellite data reception unit 30-2. A description will now be given of a procedure of the access operation performed in the satellite data distribution system according to the present invention.

(1) A user accesses the host subscriber 10 by using the PS unit 40 through the regular PHS line so as to request distribution of information.

(2) The host center 10 identifies the number of the PS unit 40. Upon identification of the number of the PS unit 40, the host center returns a data distribution request reception response to the PS unit 40 via the PHS line.

(3) The PS unit 40 sends a value added communication request (a request for satellite data distribution) to the CS unit 30-1 after interrupting the link to the network. In this step, the reception frequency and the identification number of the subscriber unit is sent.

(4) The CS unit 30-1 returns a value added communication response to the PS unit 40 to inform an acceptance of the value added communication request. When the value added communication request is accepted,the reception frequency is set in the satellite data reception unit 30-2 connected to the CS unit 30-1.

(5) The PS unit 40 send to the CS unit 30-1 a value added communication response confirmation after the value added communication response is received.

(6) The CS unit 30-1 interrupts the radio communication line after the value added communication response confirmation is received.

(7) The satellite data reception unit 30-2 sets the reception frequency by the reception frequency notification sent from the CS unit 30-1, and waits for the data from the satellite.

(8) The host center 10 transmits the requested data at a previously notified frequency to a large area.

(9) The requested data transmitted from the satellite 1 can be received only by the satellite data reception unit 30-2 in which the predetermined reception frequency is set. When the distribution of the requested data is started, the received data is temporarily stored in a memory medium in the satellite data reception unit 30-2.

(10) The data received from the satellite 1 includes the number of the subscriber to which the notification of the user is permitted. When the number received from the satellite 1 matches the number of the CS unit 30-1 which was stored when the user requested the data, the following steps are performed.

(11) The CS unit 30-1 determines a slot (channel) in the radio transmission signal for the PHS to distribute the data. Then, the CS unit 30-1 shuts the communication channel corresponding to the determined slot between the network. At the same time, the CS unit 30-1 calls the PS unit 40.

(12) When the call from the CS unit 30-1 is received by the PS unit 40, a packet communication link is established between the CS unit 30-1 and the PS unit 40. At this time, the CS unit 30-1 sends a distribution data request to the satellite data reception unit 30-2.

(13) The data received by the satellite data reception unit 30-2 is read from the memory medium in accordance with a flow control by the CS unit 30-1. The data is converted into a packet format by the CS unit 30-1, and is transferred to the PS unit 40.

(14) In the packet transfer between the CS unit 30-1 and the PS unit 40, the downward packet process is used as downward data, and an upstream packet process is used mainly for a data flow process of the downward data.

(15) When the CS unit 30-1 detects the end of the transfer of the distributed data, the link for the packet data is interrupted, and the slot for the transmission signal is released.

(16) When the slot is released, the release of the slot which was shut in the step (11) is notified to the network.

As mentioned-above, the satellite data distribution system according to the present invention has a feature in that the satellite data to be distributed to the subscriber unit is relayed by the base station unit of the mobile communication system. According to this system, a subscriber can take advantage of satellite data distribution service without satellite data reception unit.

The differences between the satellite data distribution system according to the present invention and the conventional satellite data distribution system is summarized as follows.

(a) The satellite data reception unit 30-2 is provided not to each subscriber but to the base station of the mobile communication system.

(b) An interface is provided for connecting the satellite data reception unit 30-2 to the base station unit of the mobile communication system.

(c) An interface is provided for connecting the base station unit of the mobile communication system to the satellite data reception unit 30-2.

(d) A sequence of a value added communication is provided to the control channel format of the radio communication signal between the base station of the mobile communication system and the subscriber unit.

(e) The above-mentioned functions (a)–(d) are provided by application software of the base station unit (CS unit 30-1).

Figure 3:
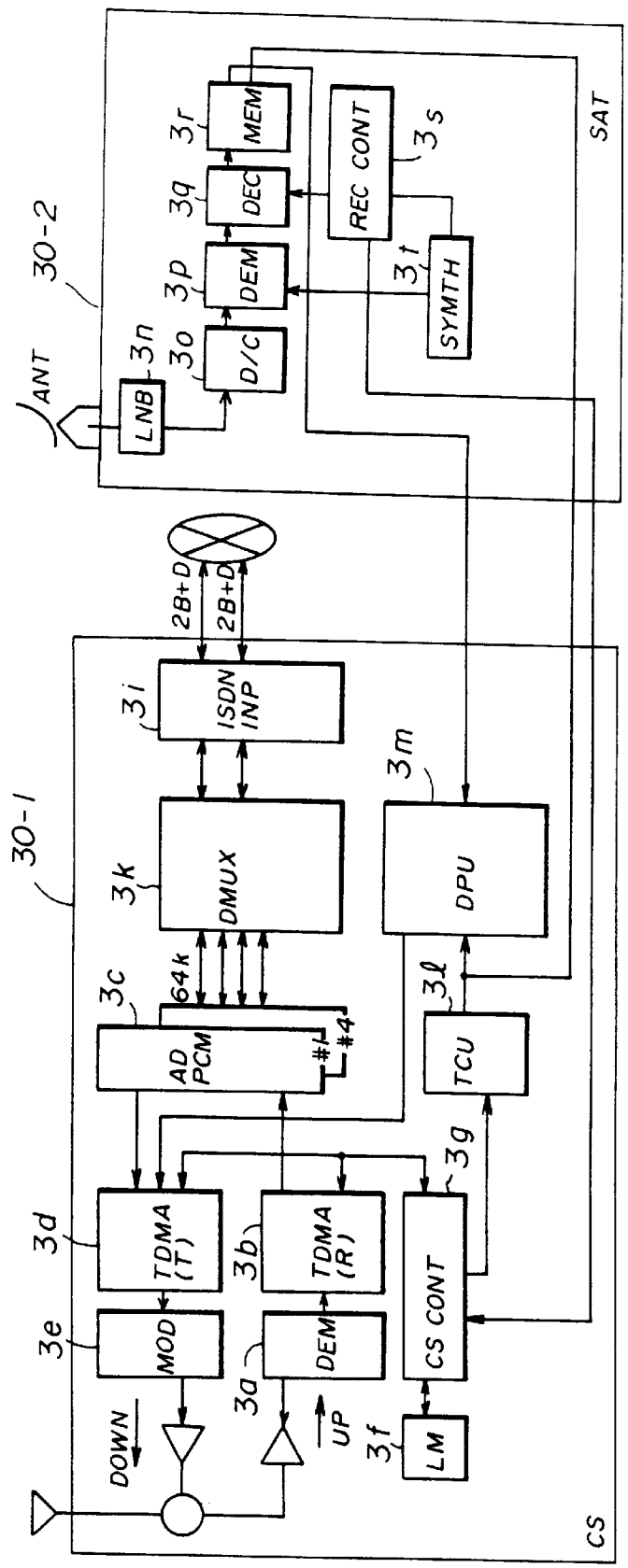
FIG. 3 is a block diagram of a base station unit of a mobile communication system used in a satellite communication system according to a first embodiment of the present invention.

A description will now be given of a first embodiment of the present invention. FIG. 3 is a block diagram of a base station unit of a mobile communication system used in a satellite communication system according to the first embodiment of the present invention.

The base station unit of the mobile communication system shown in FIG. 3 comprises The CS unit 30-1 and the satellite data reception unit 30-2.

In FIG. 3, a demodulator 3a demodulates a modulation signal received from the subscriber unit 40 to convert the modulation signal into a digital signal. The digital signal is multiplexed by a 4-channel time division multiplex method.

A TDMA processing circuit 3b demultiplexes the digital signal so as to convert the digital signal into discrete 4-channel audio digital data each comprises 32 kbps. An ADPCM codec 3c decodes the discrete 32 kbps digital data to discrete 64 kbps PCM audio data. On the other hand, with respect to the downward direction, the ADPCM codec 3c decodes PCM audio data comprising 64 kbps×4 channels to ADPCM data comprising 32 kbps×4 channels. A TDMA processing circuit 3d time-division-multiplexes the ADPCM data, and a demodulator 3e demodulates the multiplexed data to send it to the subscriber unit 40.

A data demultiplex unit 3k converts the PCM data (the digital audio data comprising 64 kbps×4 channels) into a frame format according to a basic ISDN interface, and vice versa. An ISDN interface 3i interfaces between the CS unit 30-1 and the ground network.

In the satellite data reception unit 30-2, a LNB 3n converts an RF signal, which is transmitted from the host center 10 via the satellite 1, into an IF signal in the L band (950–1450 MHz). A D/C 3o converts the L band IF signal into an IF signal in the 140 MHz band. A demodulator (DEM) 3p demodulates the 140 MHz IF signal by a signal supplied from a synthesizer 3t.

A decoder (DEC) 3q performs an error correction for the demodulated data, and eliminates redundant data therefrom. A memory (MEM) 3r comprises a medium which stores the data supplied by the DEC 3q. The data distributed via the satellite 1 is temporarily stored in the memory 3r.

The memory 3r stores the distributed data until a slot of radio transmission signal is assigned for the satellite data distribution. When the slot is assigned, the distributed data stored in the memory 3r is sequentially transferred to a data processing unit (DPU) 3m. The transfer of the distributed data is controlled by a timing control unit (TCU) 3l. The memory 3r maintains the distributed data until all data is read out therefrom.

As mentioned above, the CS unit 30-1 is provided with the data processing unit 3m, and the satellite data reception unit is provided with the memory 3r which stores the distribution data. Thus, the distribution data distributed from the satellite 1 is supplied to the CS unit 30-1 by connecting the memory 3r of the satellite data reception unit 30-2 to the data processing unit 3m of the CS unit 30-1.

The timing control unit 3l of the CS unit 30-1 is a packet for the distribution data by controlling the data processing unit 3m in accordance with the transmission timing of the radio transmission signal when a slot of the radio transmission signal is assigned for the satellite data. Additionally, the timing control unit 3l controls a transfer timing for the satellite distribution data from the memory 3r which is needed for producing the packet.

Figure 4B:
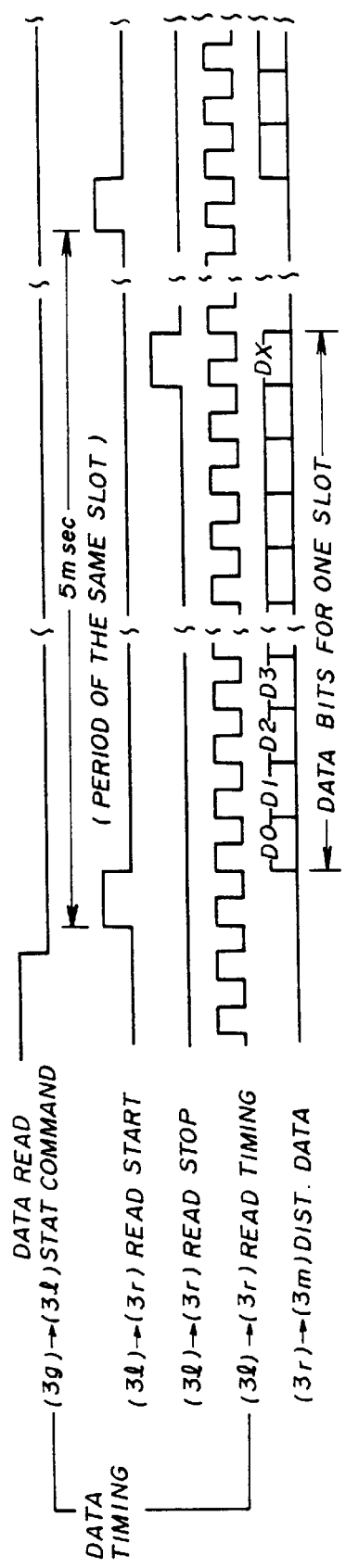
FIG. 4B is a timing chart of a data flow between the CS unit and the satellite data reception unit.

FIG. 4A is an illustration for explaining a connection between the CS unit 30-1 and the satellite data reception unit 30-2 shown in FIG. 3. FIG. 4B is a timing chart of a data flow between the CS unit 30-1 and the satellite data reception unit 30-2.

The data flow between the CS unit 30-1 and the satellite data reception unit 30-2 is controlled by the slot management function of a CS controller (CS CONT) 3g. The distribution of the data from the satellite 1 must be in a waiting state when all of the slots (channels) of the radio transmission signal are occupied or a permission to the shut request cannot be obtained from the network.

In such a case, the CS CONT 3g does not send a data read start command to the memory 3r of the satellite data reception unit 30-2 via the timing control unit 3l of the CS unit 30-1. Thus, the data flow of the satellite distribution data is controlled since the data read start command is not sent until the waiting state is cleared.

When the data read start command is sent from the CS CONT 3g, the data in the memory 3r is read in accordance with the timing indicated by FIG. 4b. That is, a read start strobe (pulse) and a read end strobe (pulse) are determined by a slot length, and the data comprising a predetermined number of bits is transferred. The transfer control of a series of distributed data is repeated by at least the number obtained by dividing the distributed data length by the slot length. By repeatedly performing the transfer operations, the data in the memory 3r is completely transferred to the slot of the radio transmission signal.

When the distributed data is assigned from data processing unit 3m to the slot of the radio transmission signal of the PHS, the following two slot assignment methods are suggested.

Figure 5B:
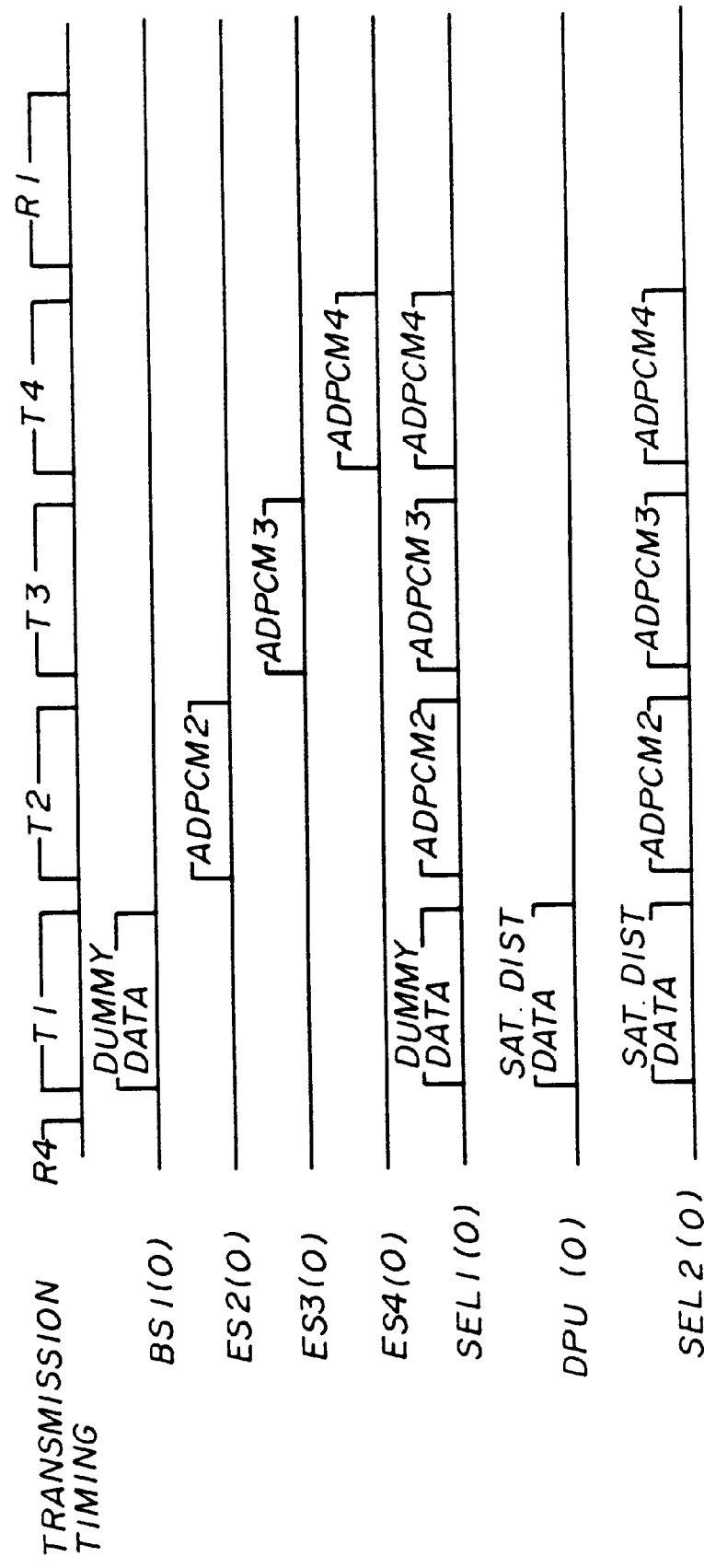
FIG. 5B is a timing chart of an assignment of the data received from the satellite.

A description will now be given, with reference to FIGS. 5A and 5B, of a method for fixedly assigning the distributed data to a predetermined slot of the radio transmission signal of the PHS. FIG. 5A is a block diagram of a part of the CS unit 30-1; FIG. 5B is a timing chart of an assignment of the data received from the satellite 1.

In the PHS, a transmission frame comprising four transmission slots T1–T4 and a reception frame comprising four reception slots R1–R4 are alternately repeated on the radio transmission signal as shown in FIG. 5B. In the method shown in FIGS. 5A and 5B, the distributed data is fixedly assigned to the slot T1 of the radio transmission signal. However, the distributed data may be fixedly assigned to one of other slots T2–T4.

In FIG. 5A, the TDMA processing unit (TDMA(T)) 3d comprises a frame producing unit (FPU) 4a, a TDMA transmission timing setting unit (TDMA-TTS) 4b and a selection unit (SEL2) 4c. The frame producing unit 4a converts time divided regular audio data and satellite distributed data into signals having a format for the radio transmission. The TDMA transmission timing generating unit 4b (TDMA-TTGU) generates and supplies timing signals to each of the parts based on the radio transmission signal. The selection unit 4c selects one of the satellite distributed data and the regular audio data for the PHS in the time division manner.

In the present embodiment, the selection unit 4c selects the data supplied from the data processing unit 3m at a timing corresponding to the slot T1 of the transmission frame of the radio transmission signal.

The ADPCM codec 3c comprises a selection unit (SEL1) 4d, rate converters (ES1–ES4) 4e-1 to 4e-4 and ADPCM coders (ADPCM1–ADPCM4) 4f-1 to 4f-4. The selection unit 4d selects the regular audio data. The rate converters 4e-1 to 4e-4 converts the ADPCM data (digital audio data) of 32 kbps into a radio transmission signal having a data rate of 384 kbps. The ADPCM coder 4f-1 to 4f-4 convert the PCM audio data of 64 kbps received from the network into ADPCM audio data of 32 kbps.

As shown in FIG. 5B, the use of the slot T1 (first channel) of the PHS transmission signal for the regular audio data is prohibited. That is, the slot T1 is exclusively used for the satellite distributed data. Accordingly, the ADPCM coder 4f-1 produces dummy data, and each of the ADPCM coders 4f-2 to 4f-4 produces the audio data of 32 kbps.

The data processing unit 3m produces the satellite distribution data at a timing of the slot T. The selection unit 4c selects at the timing of the slot T1 the satellite distribution data produced by the data processing unit 3m, and also selects audio data of 32 kbps which is produced by the ADPCM codec 3c at the timing of the slots T2–T4.

As mentioned above, three channels are connected to the network, and the remaining one channel is fixedly reserved for the satellite distribution data. In this case, in the fixedly reserved channel, when the satellite distribution data is not received, the slot T1 of the PHS radio transmission signal is empty. The slot T1 is used only when the satellite distribution data is received.

A description will now be given, with reference to FIGS. 6A and 6B, of a method for flexibly assigning the distributed data to a predetermined slot of the radio transmission signal of the PHS. FIG. 6A is a block diagram of a part of the CS unit 30-1; FIG. 6B is a timing chart of an assignment of the data received from the satellite 1.

In the PHS, a transmission frame comprising four transmission slots T1–T4 and a reception frame comprising four reception slots R1–R4 are alternately repeated on the radio transmission signal as shown in FIG. 5B. In the method shown in FIGS. 5A and 5B, the distributed data is flexibly assigned to the slot T2 of the radio transmission signal. However, the distributed data may be flexibly assigned to one of other slots T2–T4.

In FIG. 6A, the TDMA processing unit (TDMA(T)) 3d comprises, similar to the structure shown in FIG. 5A, a frame producing unit (FPU) 5a, a TDMA transmission timing generating unit (TDMA-TTGU) 5b and a selection unit (SEL2) 5c. The frame producing unit 5a converts time divided regular audio data and satellite distributed data into signals having a format for the radio transmission. The TDMA transmission timing setting unit 5b generates and supplies timing signals to each of the parts based on the radio transmission signal. The selection unit 5c selects one of the satellite distributed data and the regular audio data for the PHS in the time division manner.

In this method, different from the structure shown in FIG. 5A, the operation of the TDMA transmission timing setting unit 5b is controlled by the CS controller 3g. In this method, when one of the slots T1–T4 is not used for the regular PHS audio data, the one of the slots is flexibly used for the satellite distribution data. When the CS controller 3g assigns one of the slots T1–T4, a request for closing the 64 kbps data corresponding to the slot to which the satellite distribution data is assigned.

The ADPCM codec 3c shown in FIG. 6A comprises, similar to the ADPCM codec 3c shown in FIG. 5A, a selection unit (SEL1) 5d, rate converters (ES1–ES) 5e-1 to 5e-4 and ADPCM coders (ADPCM1–ADPCM4) 5f-1 to 5f-4. The selection unit 5d selects the regular audio data. The rate converters 5e-1 to 5e-4 converts the ADPCM data (digital audio data) comprising 32 kbps into a radio transmission signal having a data rate of 384 kbps. The ADPCM coder 5f-1 to 5f-4 convert the PCM audio data of 64 kbps received from the network into ADPCM audio data comprising 32 kbps.

As shown in FIG. 6B, the use of the slot T1 (first channel) of the PHS transmission signal for the regular audio data is prohibited by the control of the CS controller 3g when the distribution of the satellite data is requested and if the second slot T2 (second channel) is not used by the PHS. That is, the slot T2 is not used for the regular audio data but is used of the satellite distribution data. Accordingly, in this case, the ADPCM coder 5f-2 produces dummy data, and each of the ADPCM coders 5f-1 to 5f-3 and 5f-4 produces the audio data comprising 32 kbps.

The data processing unit 3m produces the satellite distribution data at a timing of the slot T under the control of the CS controller 3g. The selection unit 5c selects at the timing of the slot T2 the satellite distribution data produced by the data processing unit 3m, and also selects audio data comprising 32 kbps which is produced by the ADPCM codec 3c at the timing of the slots T1, T3 and T4.

As mentioned above, four PHS channels are regularly connected to the network, and all of the slots T1–T4 of the radio transmission signal are used for transmitting the regular PHS audio data. However, when the satellite distribution data is requested, the CS controller 3g flexibly assigns an empty channel for transmitting the satellite distribution data in accordance with the use condition of the slots.

Accordingly in this method, a slot in which a call is not established can be freely selected.

FIG. 7 is a flowchart of a sequence of the slot assignment method shown in FIGS. 6A and 6B. The flowchart shown in FIG. 7 particularly indicates an operation for assigning a slot by the CS controller 3g in the CS unit 30-1 shown in FIG.

6A. Accordingly, all of the four slots are basically used for the PHS audio data unless a request is made to transmit the satellite distribution data.

When the request for the satellite distribution data is recognized, in step S1, the CS unit 30-1 starts to assign one of the slots (channels) to the satellite distribution data. Then, the CS unit 30-1 determines, in step S2, whether or not an empty slot exists to assign the slot to the satellite distribution data. If it is determined that all of the slots are occupied by the PHS audio data, the routine proceeds to step S7 to wait until one of the slots becomes available.

If it is determined, in step S2, that an empty slot exists, the routine proceeds to step S3 in which the CS unit 30-1 requests closing of the corresponding channel of the PHS network. When a response is received, in step S4, from the network, the CS unit 30-1 obtains, in step S5, the slot to be assignable to the satellite distribution data. Thus, the CS unit 30-1 assigns the empty slot to the satellite distribution data to be transmitted. Finally, in step S6, an operation of transmitting the satellite distribution data is started by using the slot corresponding to the channel which was requested to be closed in step S3.

A description will now be given of a sequence performed in the satellite data distribution system according to the present embodiment.

Figure 8B:
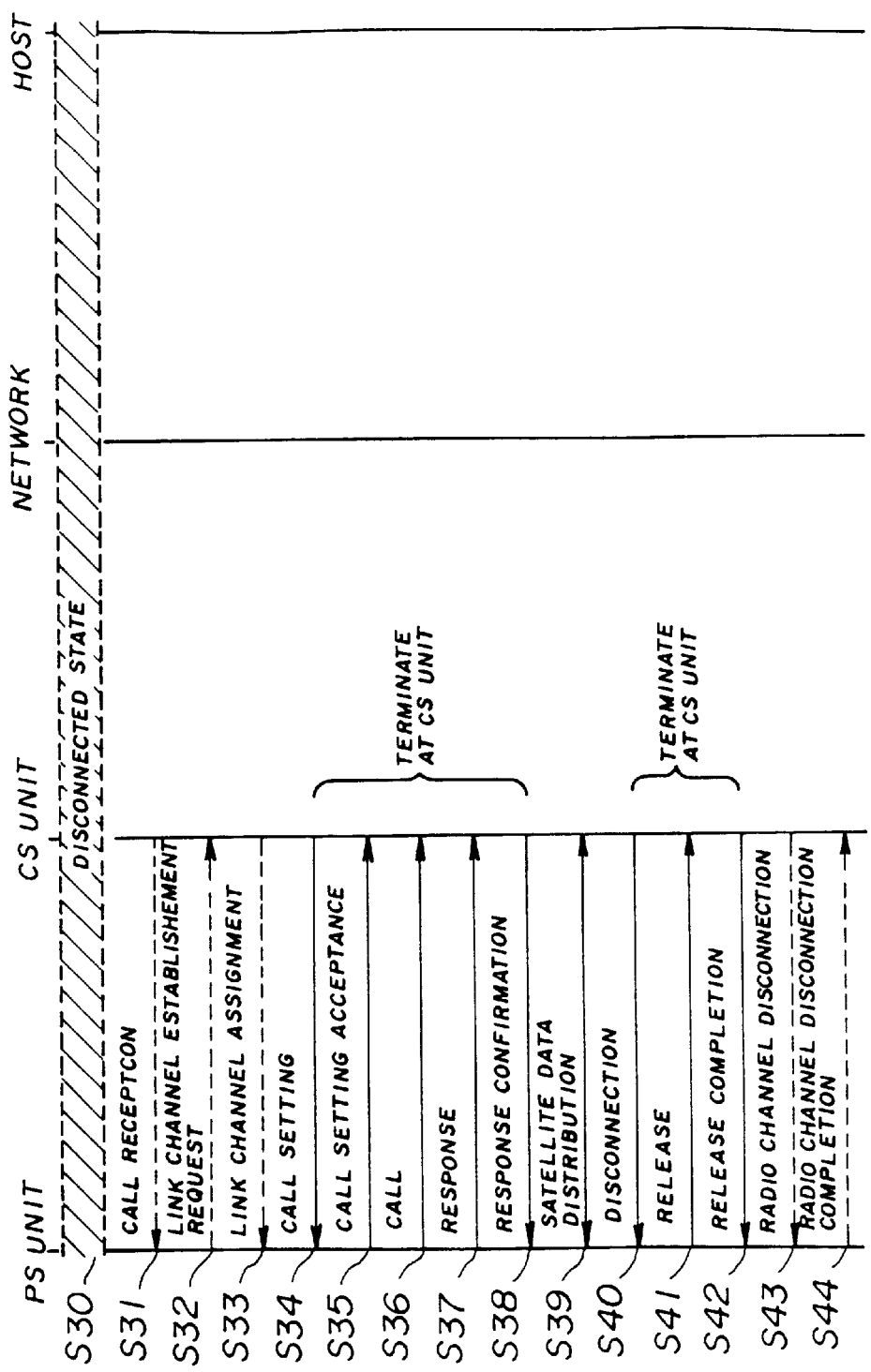

FIGS. 8A and 8B are sequence charts of an operation performed by the satellite data distribution system according to the present invention. FIG. 8A shows a part of the sequence from a request for the satellite distribution data to the distribution of the requested data to the CS unit. FIG. 8B shows a part of the sequence from the distribution of the requested data to the CS unit to the transfer of the data to the subscriber unit.

In the sequence chart shown in FIG. 8A, the subscriber requests the host center 10 to distribute the satellite distribution data. The request is sent to the host center 10 via a public telephone line. That is, a call is made from the subscriber unit 40 to the host center 10 via the mobile communication system and the public telephone network. After a line is established between the subscriber unit 40 and the host center 10, the subscriber requests the desired data to the host center 10. The above-mentioned operation corresponds to steps S10 to S19 in FIG. 8A.

Before the line is disconnected, the value added communication request is set in the subscriber unit 40. The setting of the value added communication request is performed to announce the CS unit 30-1 a frequency used by the satellite communication line. Accordingly, this setting operation must be completed before the communication with the host center 10 is ended.

When the call from the subscriber unit 40 is ended, the subscriber unit 40 can send (step S13 to S15) a reception instruction and a reception frequency to the CS unit 30-1 after the link is interrupted (step S20) and until the radio communication channel is interrupted (step S28).

Figure 9:
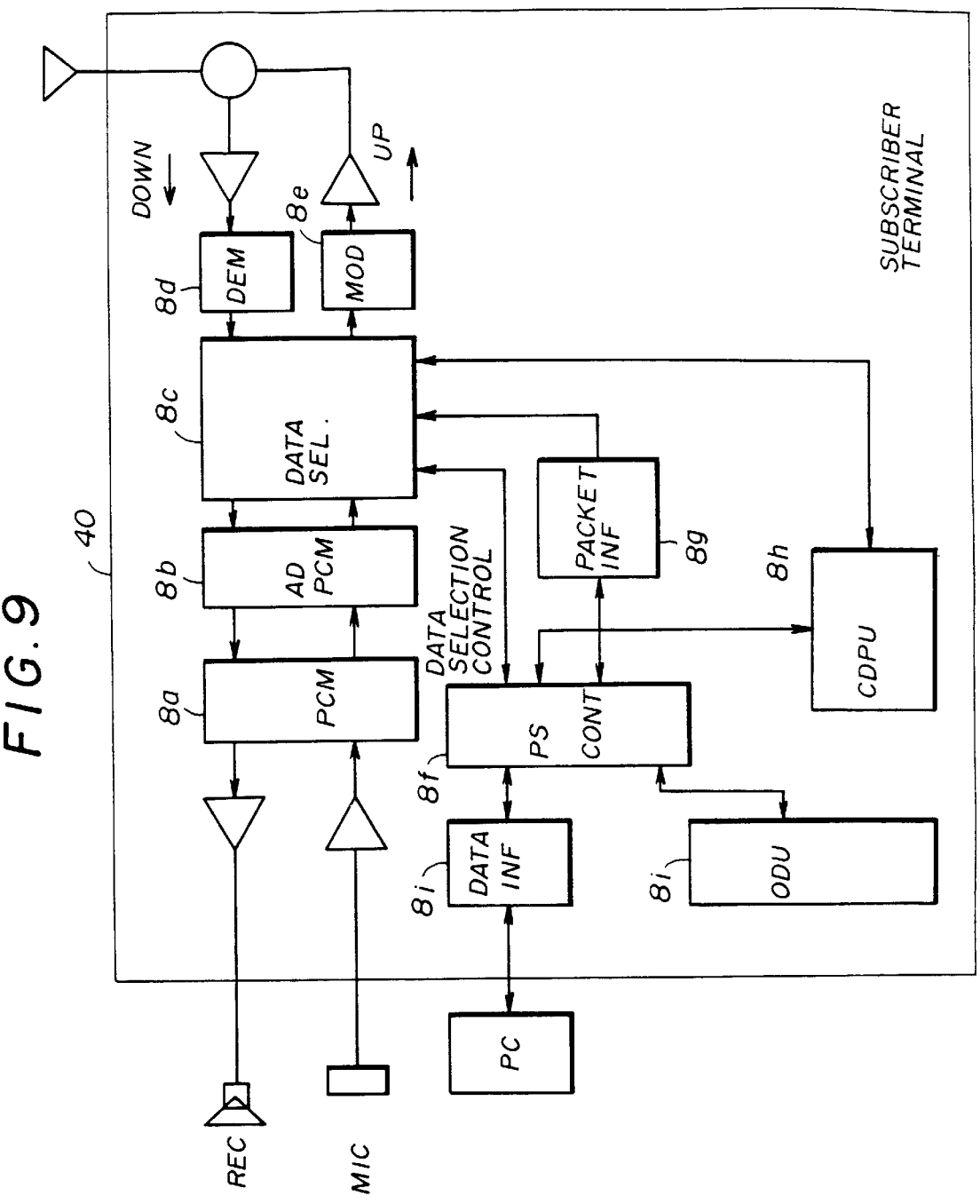
FIG. 9 is a block diagram of the subscriber unit.

FIG. 9 is a block diagram of the subscriber unit 40. In FIG. 9, a PCM unit 8a converts an analog audio signal into digital audio data comprising 64 kbps. An ADPCM codec 8b converts the digital audio data comprising 64 kbps into digital audio data comprising 32 kbps.

A data selection unit 8c selectively switches a transmission and a reception of audio data, packet data and control data. A demodulator 8d and a modulator 8e demodulate and modulate the digital data, respectively. A subscriber unit controller (PS CONT) 8f manages operations of the entire subscriber unit in accordance with a software control.

The subscriber unit shown in FIG. 9 further comprises a control data producing unit (CDPU) 8h. The control data producing unit 8h converts information input through an operational display unit 8i into signals having a format transmissible by the subscriber unit controller 8f. The information input through the operational display unit 8i may include frequency setting information and satellite distribution data request information.

The CS unit 30-1, which received the value added communication request, sends a notification to a record controller (REC CONT) 3s provided in the satellite data reception unit 30-2 so as to request the satellite distribution data. This operation is controlled by the CS controller 3g shown in FIG. 3. Then, the CS unit 30-1 waits for a confirmation that the record controller 3s becomes a receivable state.

The record controller 3s of the satellite data reception unit 30-2 shown in FIG. 3 performs a frequency setting to the frequency synthesizer 3t based on the frequency setting information received from the CS controller 3g of the CS unit 30-1. Thereby, a signal having a predetermined frequency is supplied to the demodulator 3p. After the lock of the frequency synthesizer 3t is confirmed, the record controller 3s sends a notification to the CS controller 3g of the CS unit 30-1 so a to announce that the preparation for the reception of the satellite distribution data has been completed. Then, the CS controller 3g returns a response to the value added communication to the subscriber unit 40. This operation corresponds to step S24 shown in FIG. 8A.

The value added communication request is sent, as mentioned above, after the link between the host center 10 and the subscriber unit 40 is interrupted (step S20) and until the radio communication link is interrupted (step S28). That is, this sequence is achieved by adding steps S23 and S24 as shown in FIG. 8A.

Figure 10:
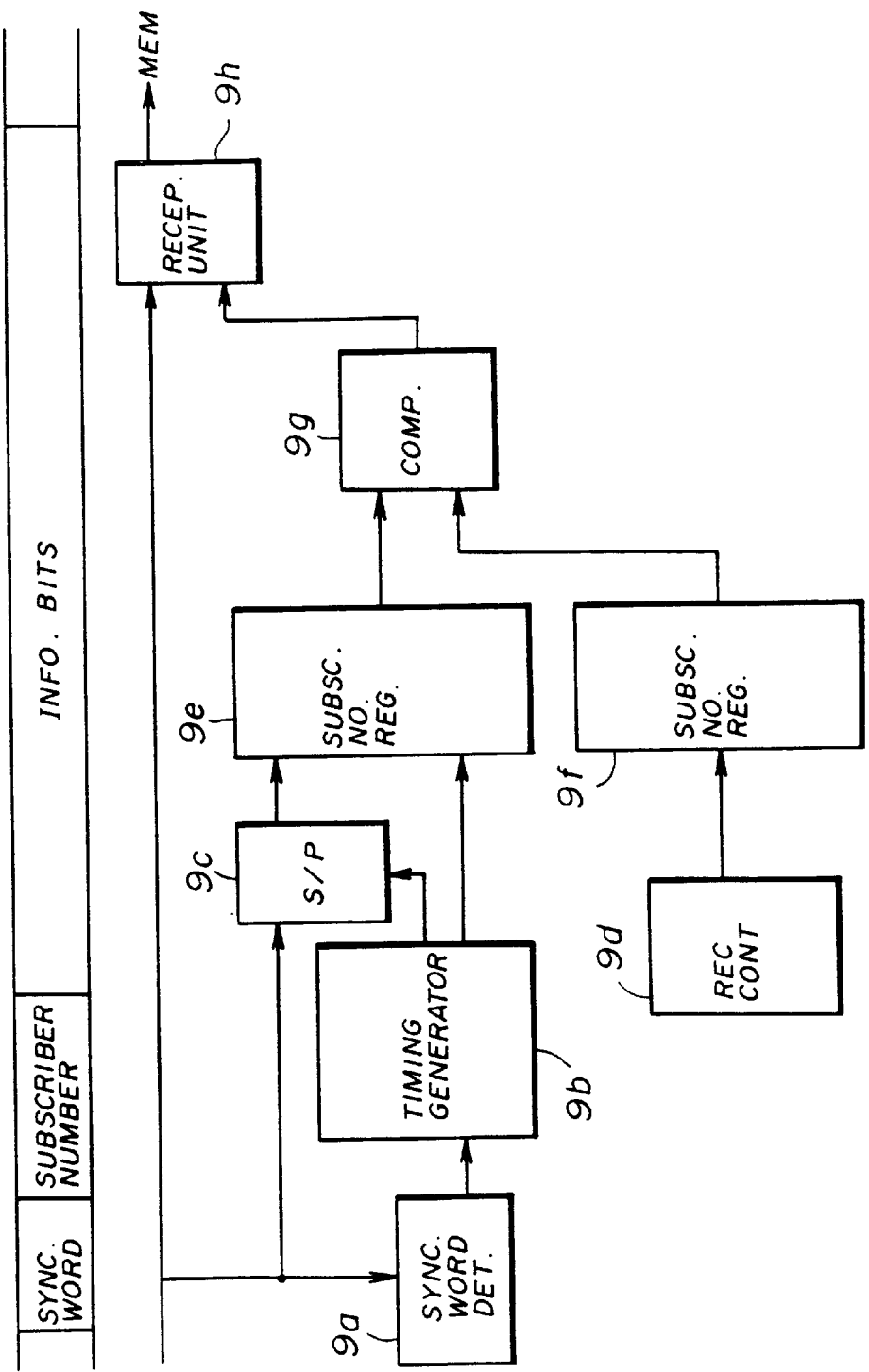
FIG. 10 is a block diagram of a subscriber number comparison unit provided in the satellite data reception unit.

FIG. 10 is a block diagram of a subscriber number comparison unit provided in the satellite data reception unit 30-2. The subscriber number comparison unit is connected to the memory unit 3r of the satellite data reception unit 30-2 shown in FIG. 3 but not shown in the figure.

In FIG. 10, the frequency information is from the CS controller 3g of the CS unit 30-1 to the record controller 3s of the satellite data reception unit 30-2. At the same time, the number of the subscriber unit requesting the satellite distribution data is notified to the satellite data reception unit 30-2.

The record controller 9d shown in FIG. 10 has substantially the same function as the record controller 3s shown in FIG. 4.

The record controller 9d registers a subscriber number, which is sent from the CS controller 3g, to a subscriber number register 9f. The frame format of data received from the satellite comprises, as shown in the upper side of FIG. 10, a synchronization word, a subscriber number and a distribution data area (information bits). The data having this frame format is repeatedly transmitted.

When the satellite data reception unit 30-2 receives the distribution data, the synchronization word is detected by a synchronization word detector (SYNC. WORD DET.) 9a. Thereafter, a subscriber number reception timing generator 9b detects the subscriber number in the data frame of the satellite distribution data. Then, a serial-to-parallel converter (S/P) 9c converts serial subscriber number data into parallel subscriber number data and supplies it to a subscriber number register 9e. The parallel subscriber data is registered in the subscriber number register 9e which is provided for storing the satellite distribution data.

Additionally, in a comparator 9g, the subscriber number stored in the subscriber number register 9f, which was stored by the CS unit 30-1, is compared with the subscriber number stored in the subscriber number register 9e which was extracted from the frame of the satellite distribution data. If the subscriber numbers match, the data received by a reception unit 9h is transferred to the memory unit 3r. If the subscriber numbers do not match, the data received from the satellite is discarded by the satellite data reception unit 30-2.

A description will now be given, with reference to FIG. 8B, of a sequence for transferring the satellite distribution data from the CS unit to the subscriber unit.

When the CS unit 30-1 receives the distribution data via the satellite 1 (step S29), the CS unit 30-1 checks the condition of use of the slots of the PHS radio transmission signal, and request to the network to close the line corresponding to an empty slot. When the CS unit 30-1 receives from the network a response to accept the request, the CS unit 30-1 calls the subscriber unit. This operation corresponds to steps S31 to S38 shown in FIG. 8B.

After the link for the distribution data is established between the CS unit 30-1 and the subscriber unit 40, the distribution data is transferred from the CS unit 30-1 to the subscriber unit 40 (step S39). Then, the CS unit 30-1 automatically interrupts the line as indicated by steps S40 to S42.

Figure 11:
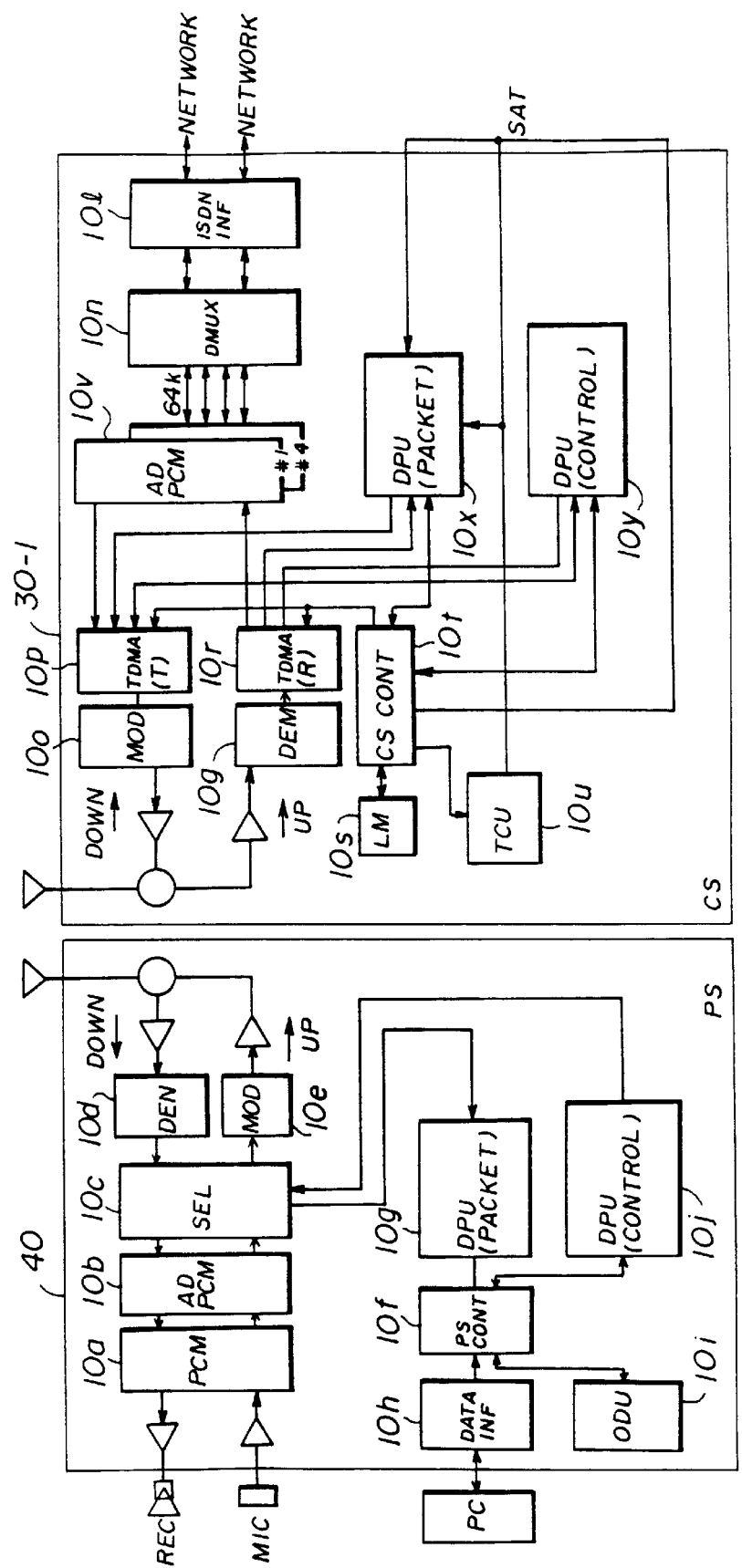
FIG. 11 is a block diagram of the CS unit and the subscriber unit which together enable switching of transmission and reception between audio data and packet data.
Figure 12A:
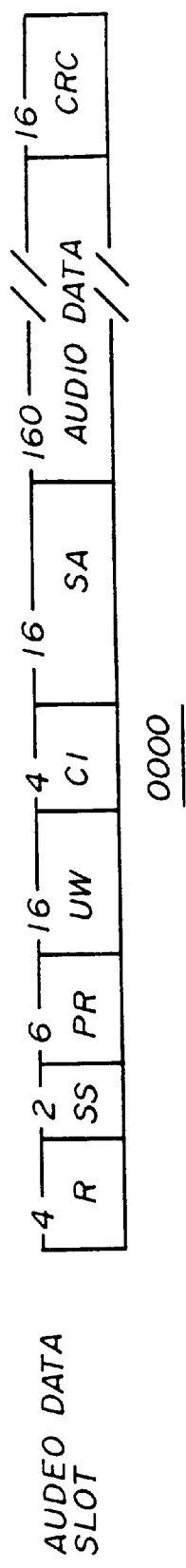
FIG. 12 is an illustration of slot structures for the audio data and the packed data.
Figure 12B:
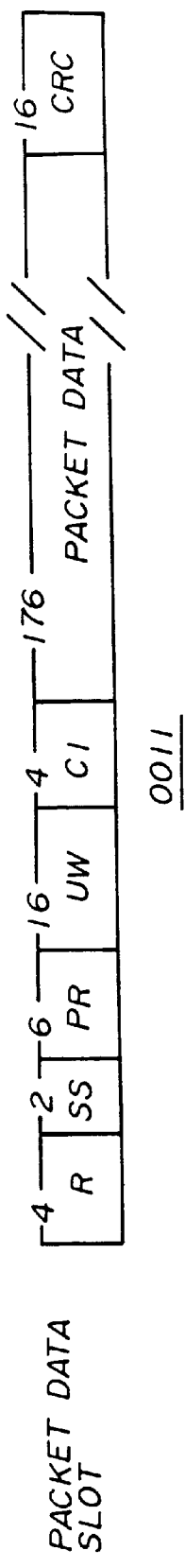

A description will now be given, with reference to FIGS. 11 and FIGS. 12A and 12B, of a data transfer operation between the CS unit and the subscriber unit (PS unit). FIG. 11 is a block diagram of the CS unit and the subscriber unit which together enable switching of transmission and reception between the audio data and the packet data. In FIG. 11, parts that are the same as the parts shown in FIGS. 3 and 9 are given the same designation and suffix to the reference numerals, and descriptions thereof will be omitted. FIG. 12A is an illustration of a slot structure for the audio data, and FIG. 12B is an illustration of a slot structure of the packet data (distribution data). In FIGS. 12A and 12B, R represents a ramp time; SS represents a start symbol; PR represents a preamble; UW represents a unique word; CI represents a channel type; and SA represents a slow additional control channel.

In the CS unit 30-1 shown in FIG. 11, when the distribution data is transmitted to the subscriber, the channel type CI is set to a value different from a value used for the audio data. The channel type is used to indicate a type of transmission data. That is, when the audio data is transmitted, the channel type CI is set, for example, to "0000", while the channel type is set to "0011" when the satellite distribution data is transmitted.

In FIG. 11, when the CS unit 30-1 transmits the audio data to the subscriber unit 40, a TDMA transmission processing unit lop sets the channel type CI of a slot structure to "0000", and supplies the audio data from ADPCM codecs 10v to a modulator (MOD) 10o.

On the other hand, when the CS unit 30-1 transmits the packet data (distribution data) to the subscriber unit 40, the TDMA transmission processing unit (TDMA(T)) 10p sets the channel type CI of a slot structure to "0011", and supplies the distribution data from a distribution data processing unit (DDPU) 10x to the modulator 10o. These processes are controlled by a CS controller 10t.

Additionally, the subscriber unit 40, which received the frame comprising the slot structure, detects the channel type CI from the slot structure, and determines whether the received data is the audio data or the distribution data (packet data). The same function may be provided either in the upward direction or the downward direction.

Figure 13A:
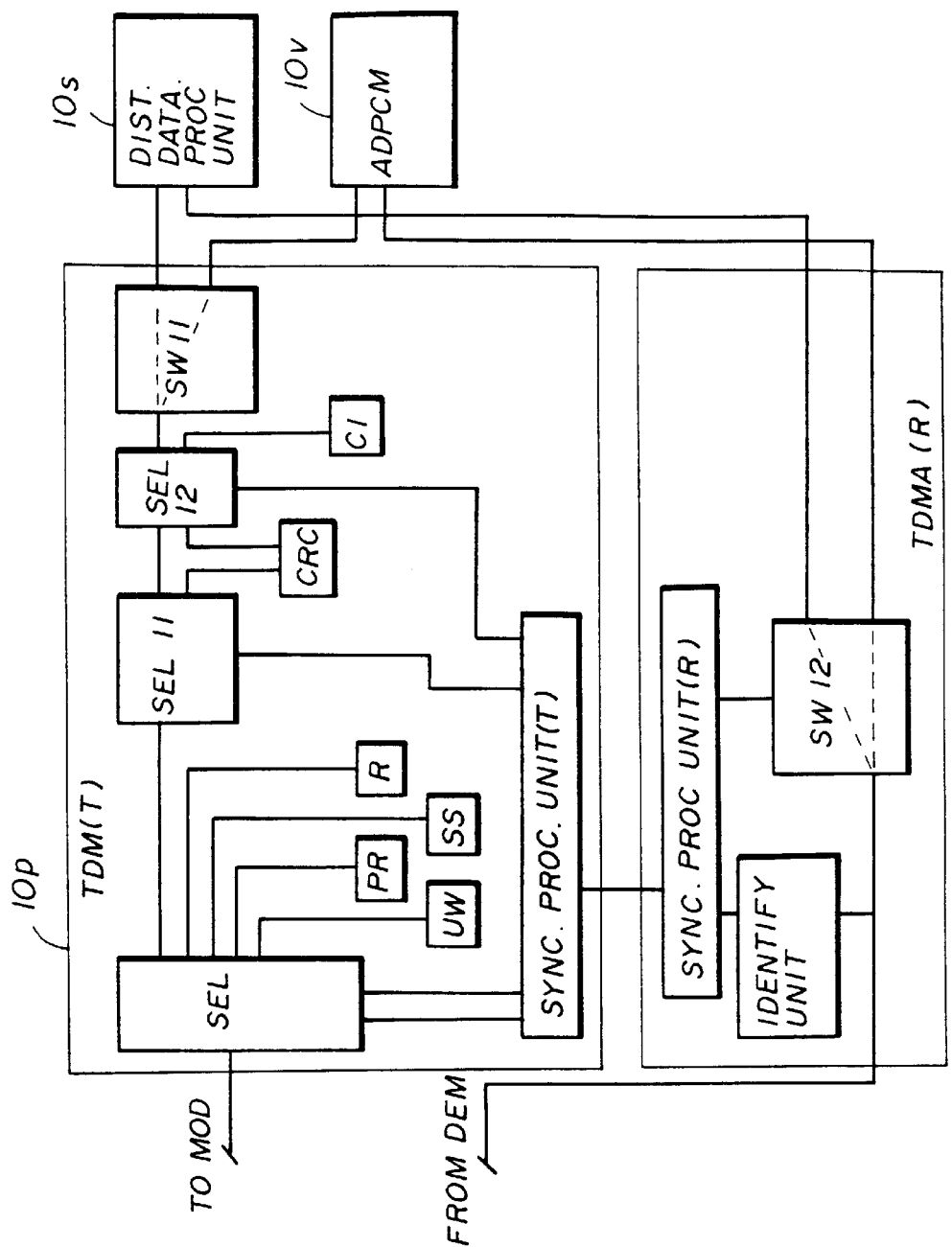
FIG. 13 is a block diagram of a data selection unit of the subscriber unit and a TDMA transmission processing unit and a TDMA reception processing unit of the CS unit shown in FIG. 11.
Figure 13B:
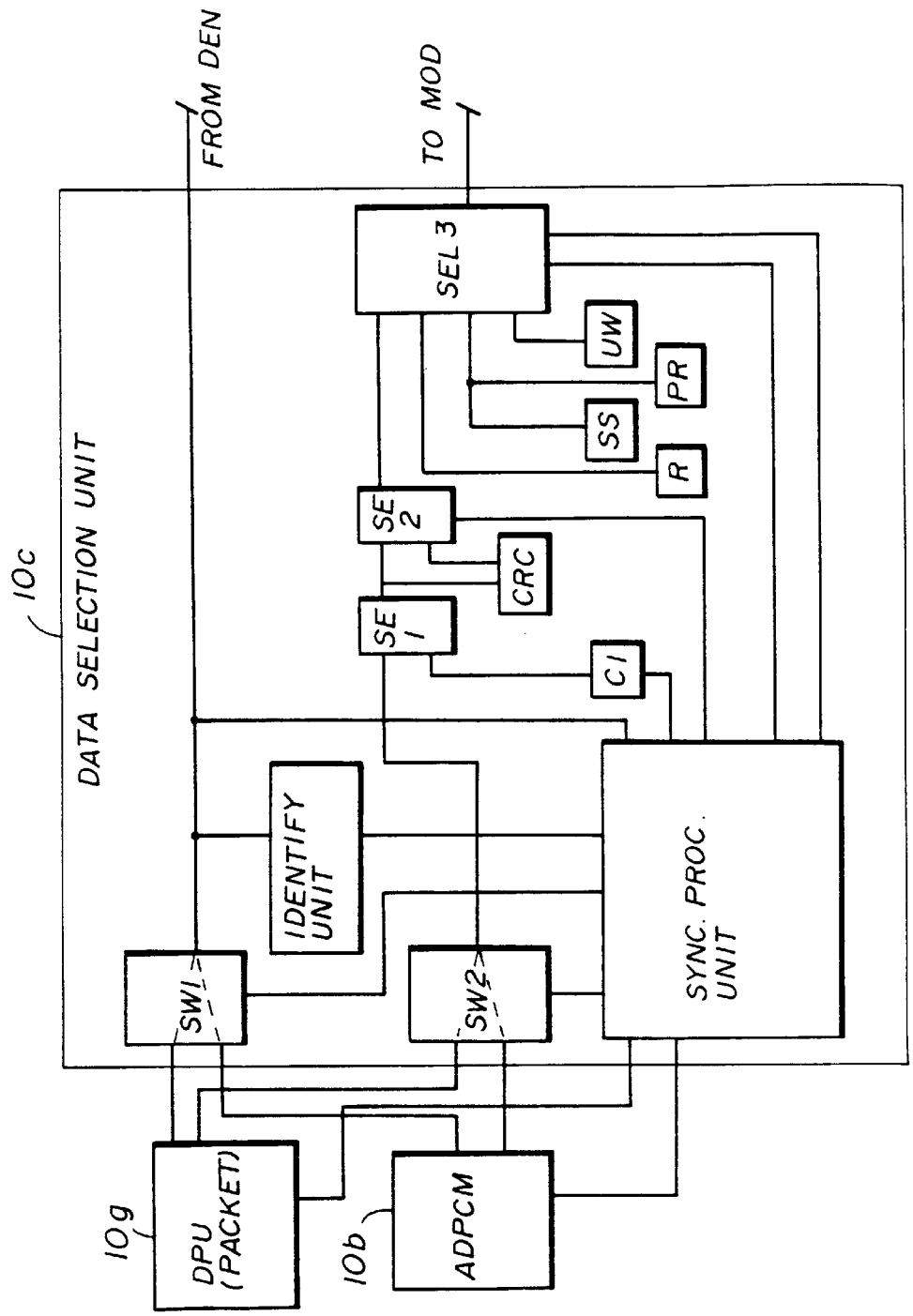

FIG. 13 is a block diagram of the data selection unit (SEL) 10c of the subscriber unit and the TDMA transmission processing unit (TDMA(T)) 10p and the TDMA reception processing unit (TDMA(R)) 10r of the CS unit shown in FIG. 11. In the CS unit 30-1, the distribution data from the distribution data processing unit 10x or the audio data from the ADPCM codecs 10v is selected by a switch SW11.

Thereafter, a channel type which indicates the audio data or the packet data is added by a selector (SEL12), and then an error correction code CRC is added by a selector (SEL11). The selected data is further added a ramp time R, a start symbol SS, a preamble PR and a unique word UW, and the data is sent to the modulator 10o shown in FIG. 11.

On the other hand, the subscriber unit 40 identifies the received data after acquiring a synchronization with the data received by the demodulator 10d. The identified data is selectively transferred to the packet data processing unit (DPU) 10g or the ADPCU 10b via a switch (SW1). With regard to the upward direction from the subscriber unit 40 to the CS unit 30-1, a reverse operation is performed. According to the above-mentioned process, transmission and reception of the packet data (satellite distribution data) as well as the audio data is achieved by using the CS unit and the subscriber unit for the PHS.

Figure 14:
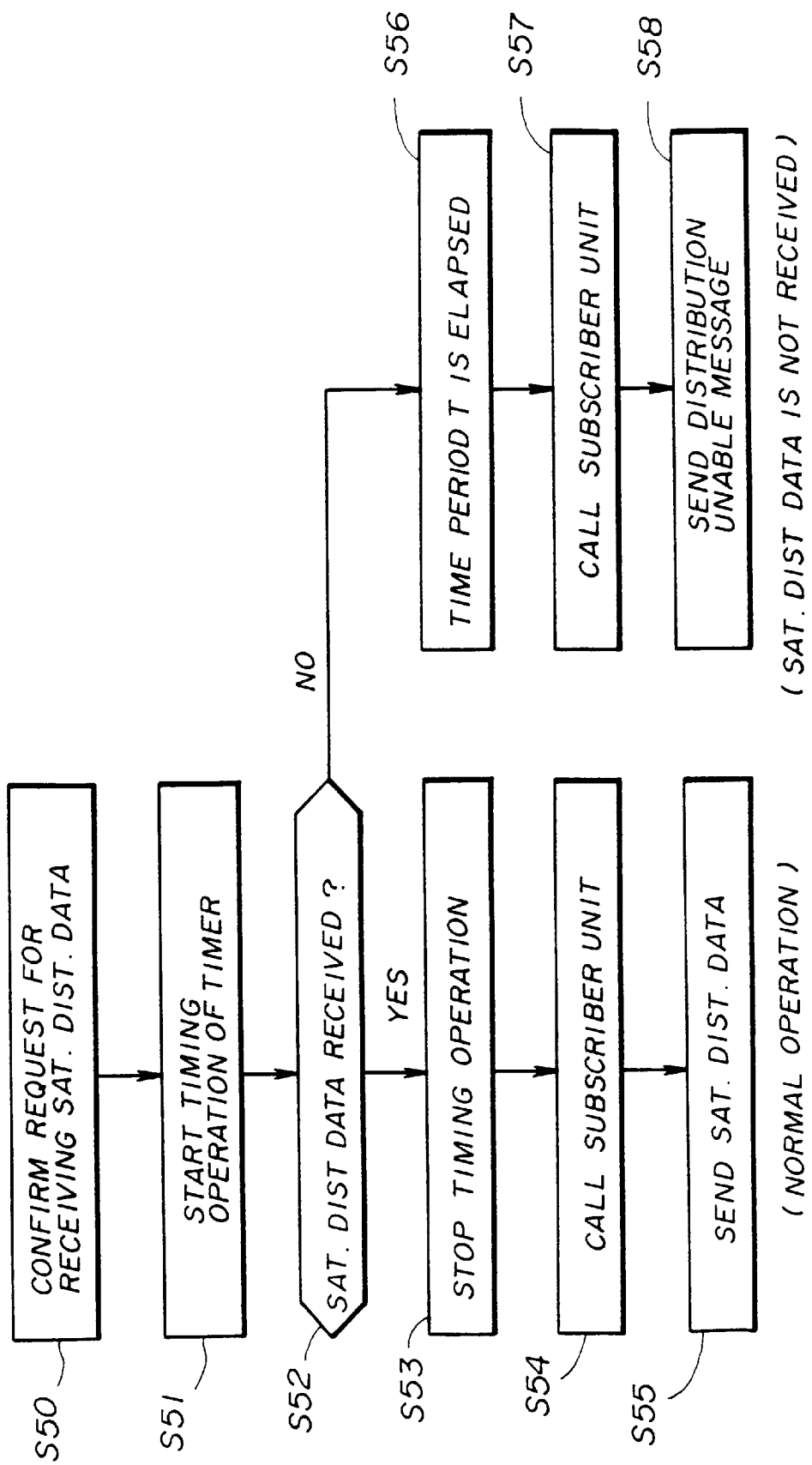
FIG. 14 is a flowchart of a calling operation performed by the CS unit when the satellite distribution data is not received.

FIG. 14 is a flowchart of a calling operation performed by the CS unit when the satellite distribution data is not received. A request for distribution data transmission of the subscriber unit 40 is sent to the CS unit 30-1 by the value added communication request in step S23 shown in FIG. 8A. In step S50 shown in FIG. 14, the request from the subscriber unit 40 is confirmed by the CS unit 30-1. Then, in step S51, the CS unit 30-1 waits for the distribution data addressed to the subscriber to be transmitted from the satellite 1 for a predetermined time period T. That is, a timing operation of a timer is started in step S51.

When the desired distribution data is received within the predetermined time period T, the distribution data is transferred to the subscriber unit 40 (steps S52 to S55). That is, it is determined, in step S52, whether or not the distribution data is received. If it is determined that the desired distribution data is received, the routine proceeds to step S53.

However, if it is determined, in step S52, that the desired distribution data is not received within the predetermined time period T, the routine proceeds to step S56. In step S56, the timing operation of the timer is resumed, that is, the predetermined time period T has elapsed. Then, the CS unit 30-1 automatically calls the subscriber unit 40 so as to send a distribution unable message (steps S57 and S58).

A description will now be given of a remote loading system of a base satiation unit of a mobile communication system. In the following description the PHS is referred to as the mobile communication system.

Figure 15:
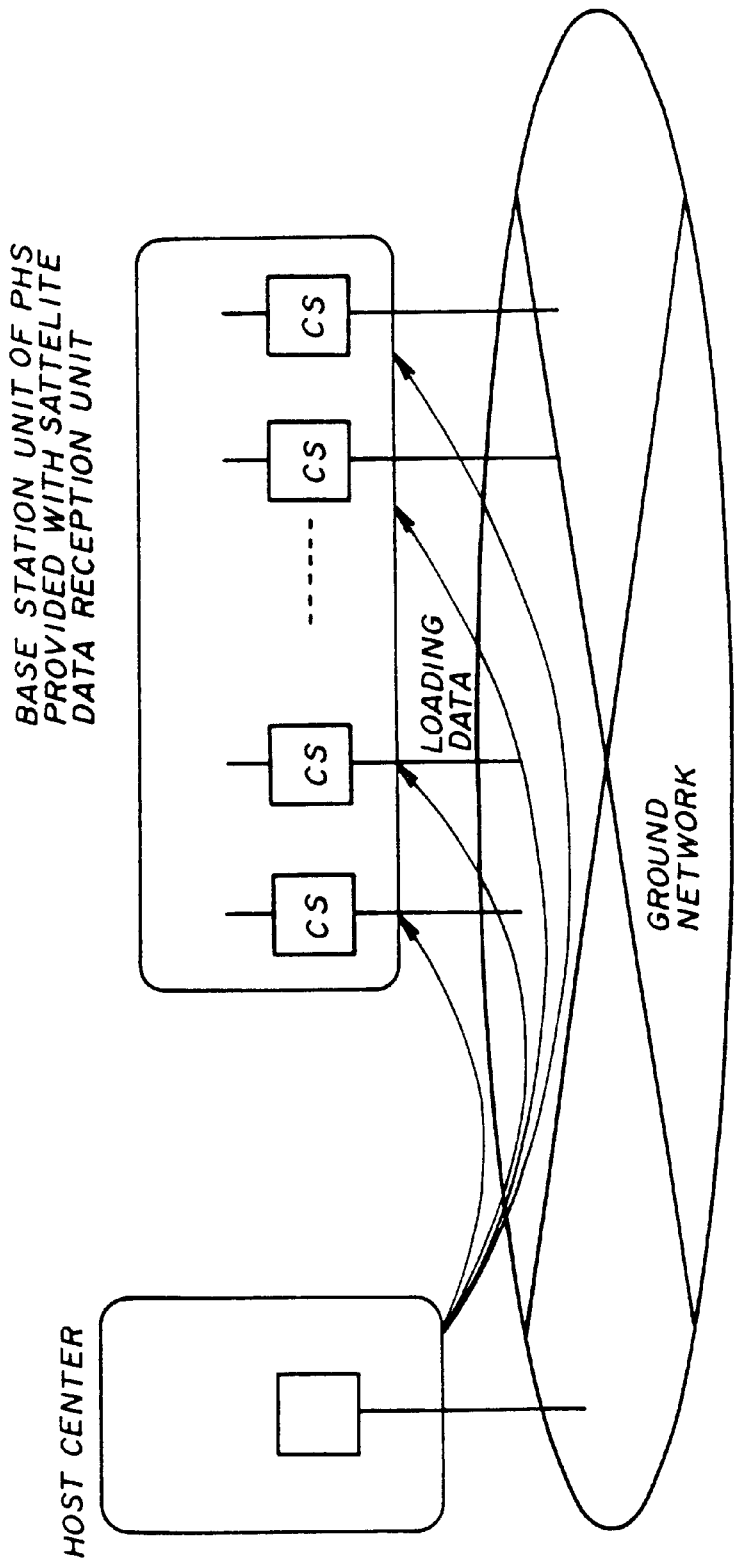
FIG. 15 is an illustration of a conventional remote loading system.
Figure 16:
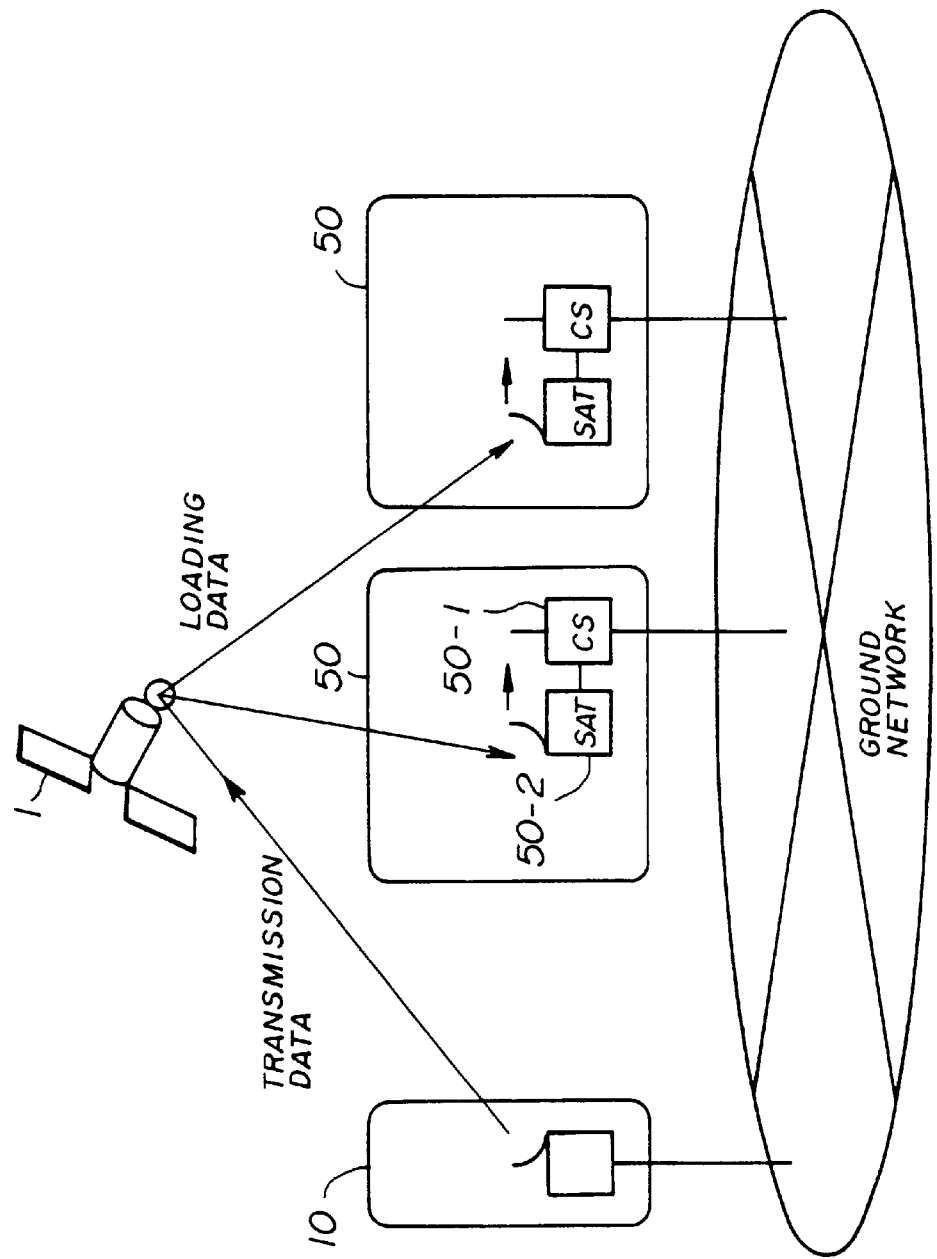
FIG. 16 is an illustration of a remote loading system using the satellite data distribution system according to the present invention.

FIG. 15 is an illustration of a conventional remote loading system. FIG. 16 is an illustration of a remote loading system using the satellite data distribution system according to the present invention. The remote loading system shown in FIG. 16 is an application of the satellite data distribution system using a mobile communication system according to the present invention in which a requested is made by a subscriber unit.

In the conventional remote loading system, a plurality of CS units for PHS are connected to a host center via a ground network. Accordingly, a remote loading such as a loading of application software can be performed by transferring the application software from the host unit to each of the CS units via the ground network. However, this remote loading method has the following problems.

i) When performing a remote loading, a call must be made by the host unit with respect to each of the CS units via the ground network. Accordingly, an upgrade of the entire system is performed, for example, it takes a long time to complete the loading for all of the CS units. That is, the entire loading time is (a time period for loading a single CS unit) x (a number of CS units).

ii) Since the loading is performed unit by unit, a timing of switching to the new application software is different for each CS unit. In such a case, the CS units to which the remote loading has already applied are operated by the new software while the CS units to which the remote loading has not been performed yet are operated by the old software. This may cause a problem in that the CS units are operated by different application software.

On the other hand, the remote loading system using the satellite data distribution system according to the present invention can eliminate the above-mentioned problems. That is, in the remote loading system shown in FIG. 16, application software can be simultaneously distributed from the host center 1 to each of the CS units 50 via the satellite 1. Additionally, the switching timing of the application software to the new application software can be announced from the host center 1 to each of the CS units via the satellite 1.

Figure 17:
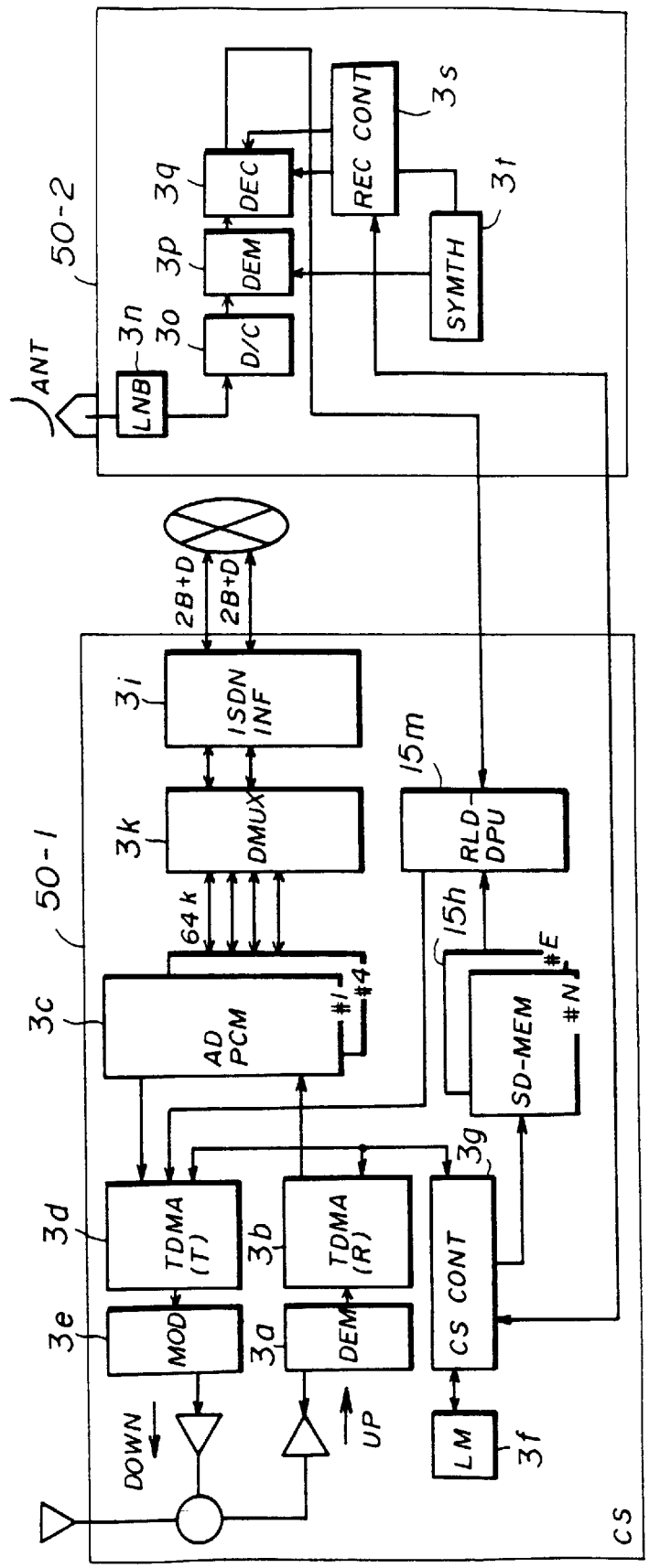
FIG. 17 is a block diagram of a base station unit of a mobile communication system which achieves a remote loading system.
Figure 18:
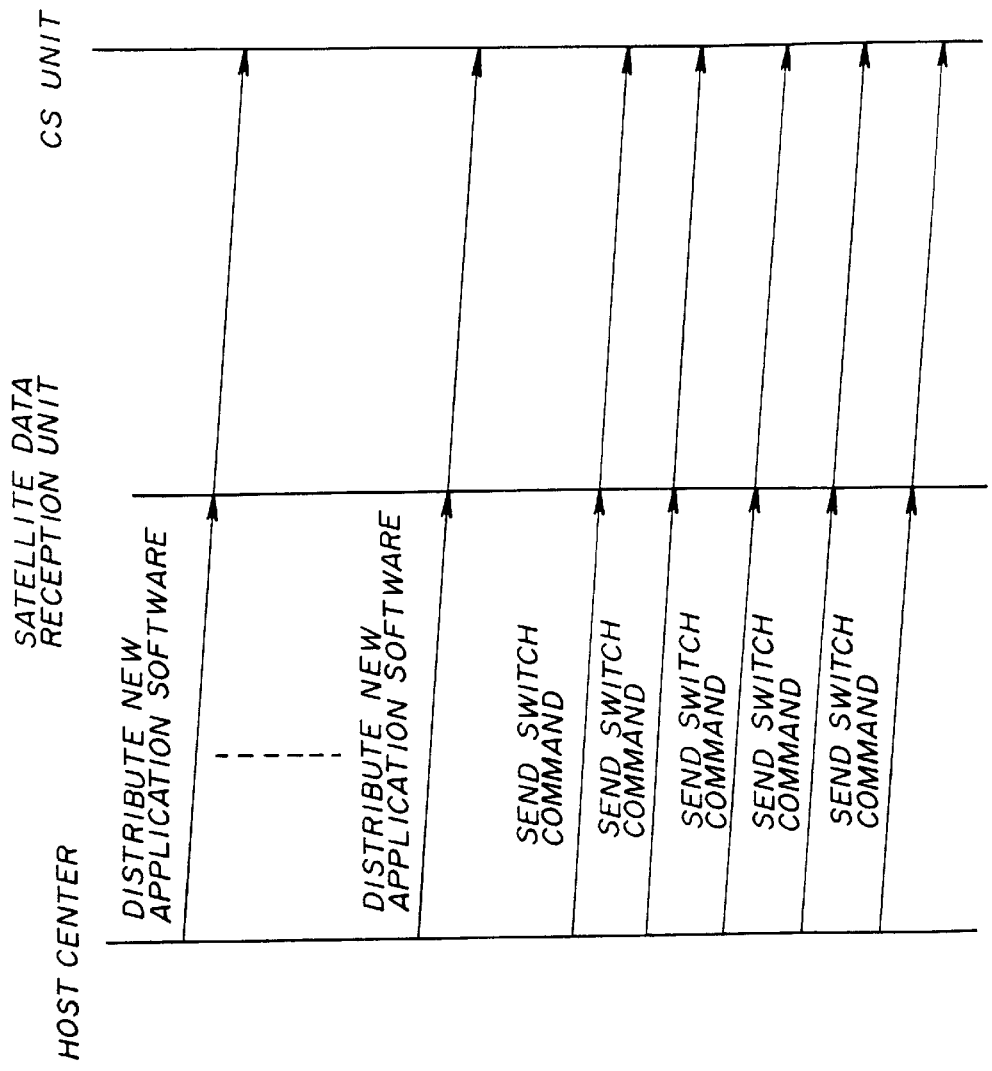
FIG. 18 is a sequence chart of a remote loading operation performed by the remote loading system.

FIG. 17 is a block diagram of a base station unit of the mobile communication system which achieves the above-mentioned remote loading system. FIG. 18 is a sequence chart of a remote loading operation performed by the remote loading system. In FIG. 17, parts that are the same as the parts shown in FIG. 3 are given the same reference numerals, and descriptions thereof will be omitted. The structure of the CS unit 50-1 and the satellite data reception unit are substantially the same as that of the CS unit 30-1 and the satellite data reception unit 30-2. Accordingly, a description will be given below of a part relevant to the remote loading function.

When the remote loading data for the CS unit is received by the satellite data reception unit 50-2 via the satellite 1, the remote loading data is transferred to a remote loading data processing unit (RLD-DPU) 15$m$ of the CS unit 50-1. The remote loading data, which may be application software, is converted from serial data to parallel data, and then stored in a system data memory 15$h$.

The system data memory 15$h$ uses a dual system comprising an actually used system and a non-actually used system. A system data memory for the actually used system stores the currently used application software. The new application software loaded via the satellite 1 is stored in a system data memory for the non-actually used system. Then, each of the CS units simultaneously switches to the new application when an actual/non-actual switching command is received via the satellite 1.

In FIG. 18, the distribution of the new application software is performed a plurality of times, and also the switching of the system data memory is performed a plurality of times. This does not mean that the loading data and switching command are sequentially distributed to the base station units one after another. This operation is performed to increase the probability of accurate reception of the loading data and the switching command. If accurate reception of the loading data and the switching command is assured, the distribution of the loading data and the switching command may be performed only once. Thus, the time period spent on the distribution of the loading data can be greatly reduced as compared to the conventional loading system which uses only the ground network. Additionally, according to the remote loading system using the satellite data distribution system according to the present invention, a maintenance operation can be rapidly performed to a plurality of base station units at the same time. Further, the switching to the loaded application software in a plurality of base station units can be performed at the same time via the satellite 1, and thus reliability of the mobile communication system is increased.

Figure 19:
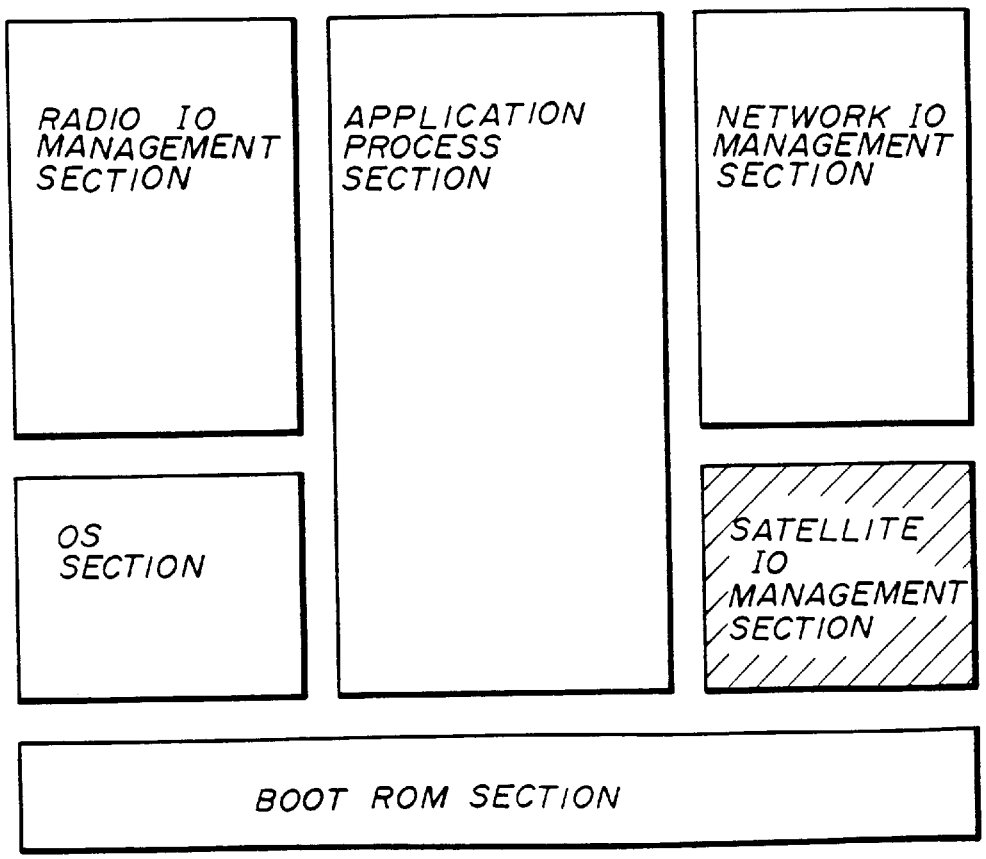
FIG. 19 is an illustration of an entire structure of a software to operate the base station unit provided in the satellite data distribution system according to the present invention.
Figure 20A:
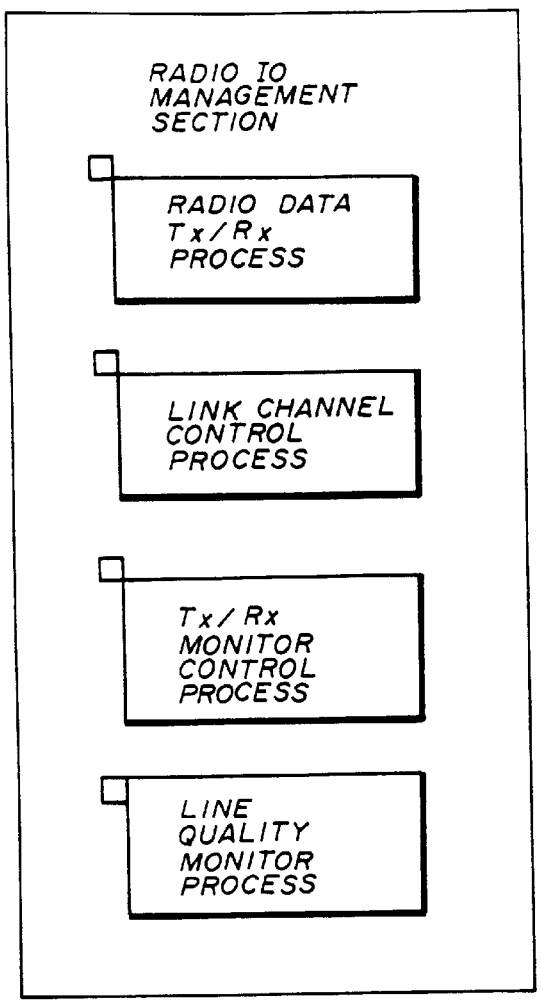
FIGS. 20A is an illustration of a detailed structure of a radio IO management section shown in FIG. 19.
Figure 20B:
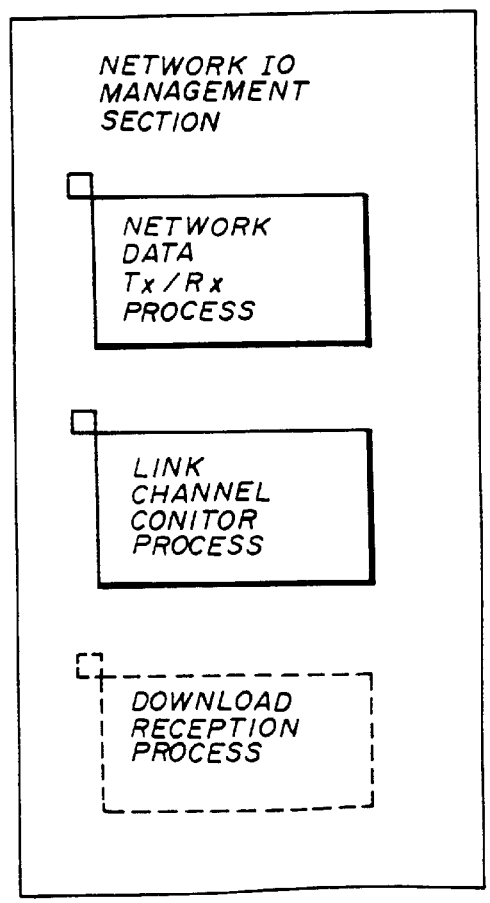
FIG. 20B is an illustration of a detailed structure of a network IO management section shown in FIG. 19.
Figure 20C:
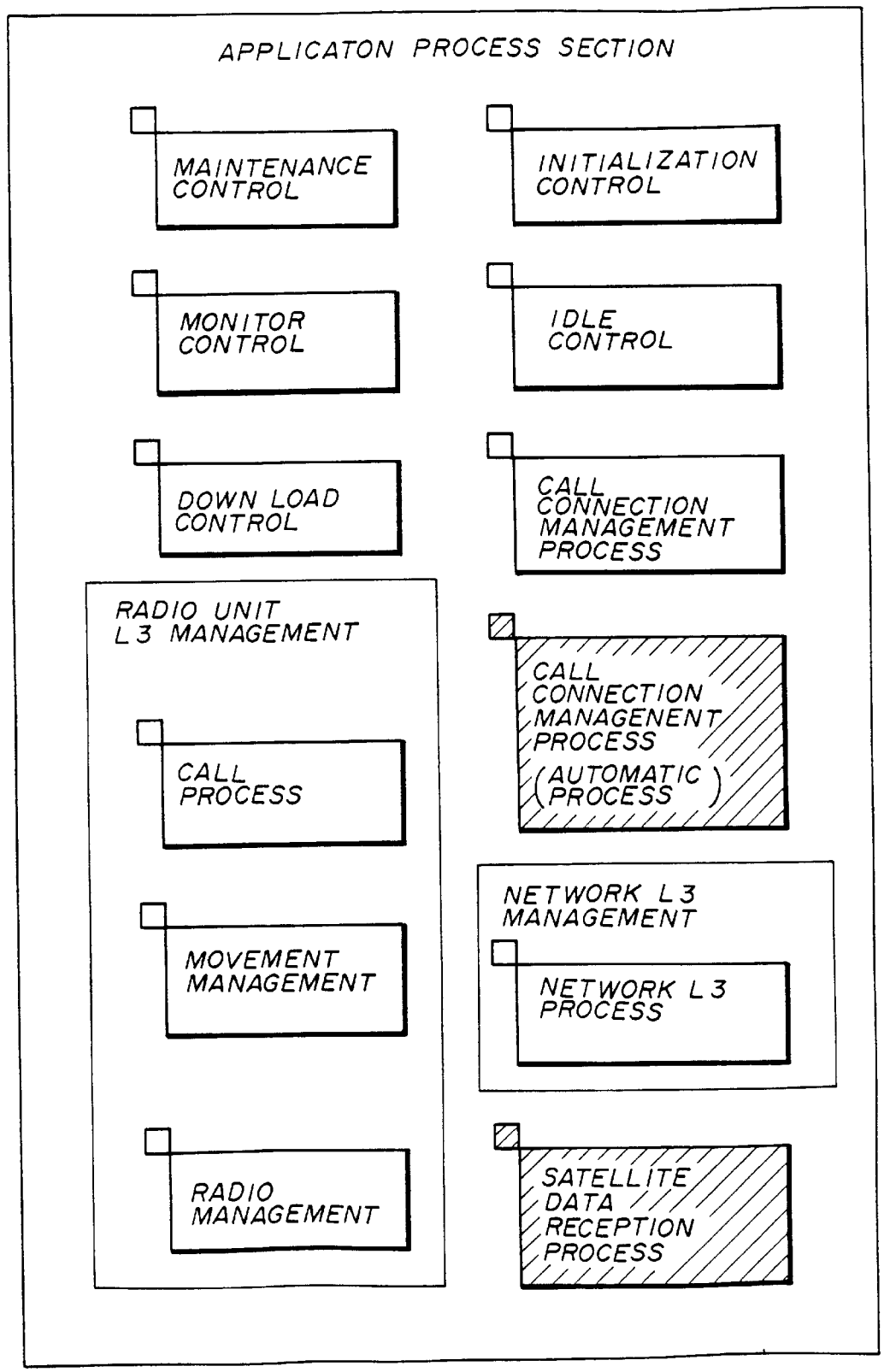
FIG. 20C is an illustration of a detailed structure of an application section shown in FIG. 19.
Figure 20D:
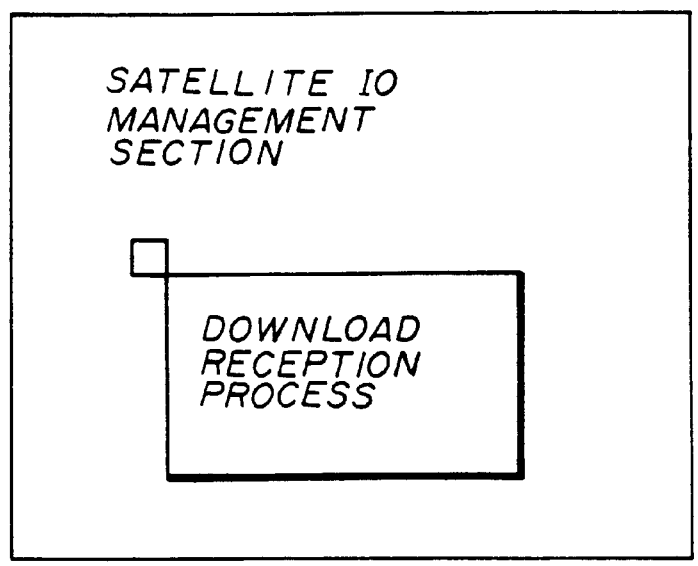
FIG. 20D is an illustration of a detailed structure of a satellite IO management section shown in FIG. 19.
Figure 20E:
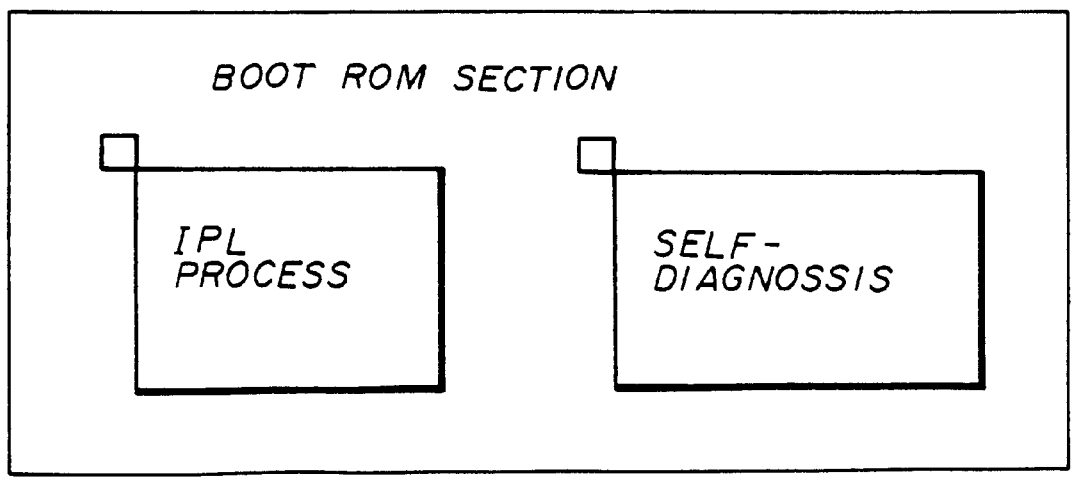
FIG. 20E is an illustration of a detailed structure of a boot ROM section shown in FIG. 19.

A description will now be given of a software structure which is used for operating the satellite data distribution system according to the present invention. FIG. 19 is an illustration of an entire structure of a software for operating the base station unit provided in the satellite data distribution system according to the present invention. FIG. 20A is an illustration of a detailed structure of a radio IO management section shown in FIG. 19; FIG. 20B is an illustration of a detailed structure of a network IO management section shown in FIG. 19; FIG. 20C is an illustration of a detailed structure of an application section shown in FIG. 19; FIG. 20D is an illustration of a detailed structure of a satellite IO management section shown in FIG. 19; and FIG. 20E is an illustration of a detailed structure of a boot ROM section shown in FIG. 19. In FIG. 19 and FIGS. 20A to 20E, hatched portions are added to the software of a CS unit of the conventional PHS. That is, the satellite distribution system and the remote loading system according to the present invention are achieved by adding software programs corresponding to the hatched portions in the figures.

Figure 21:
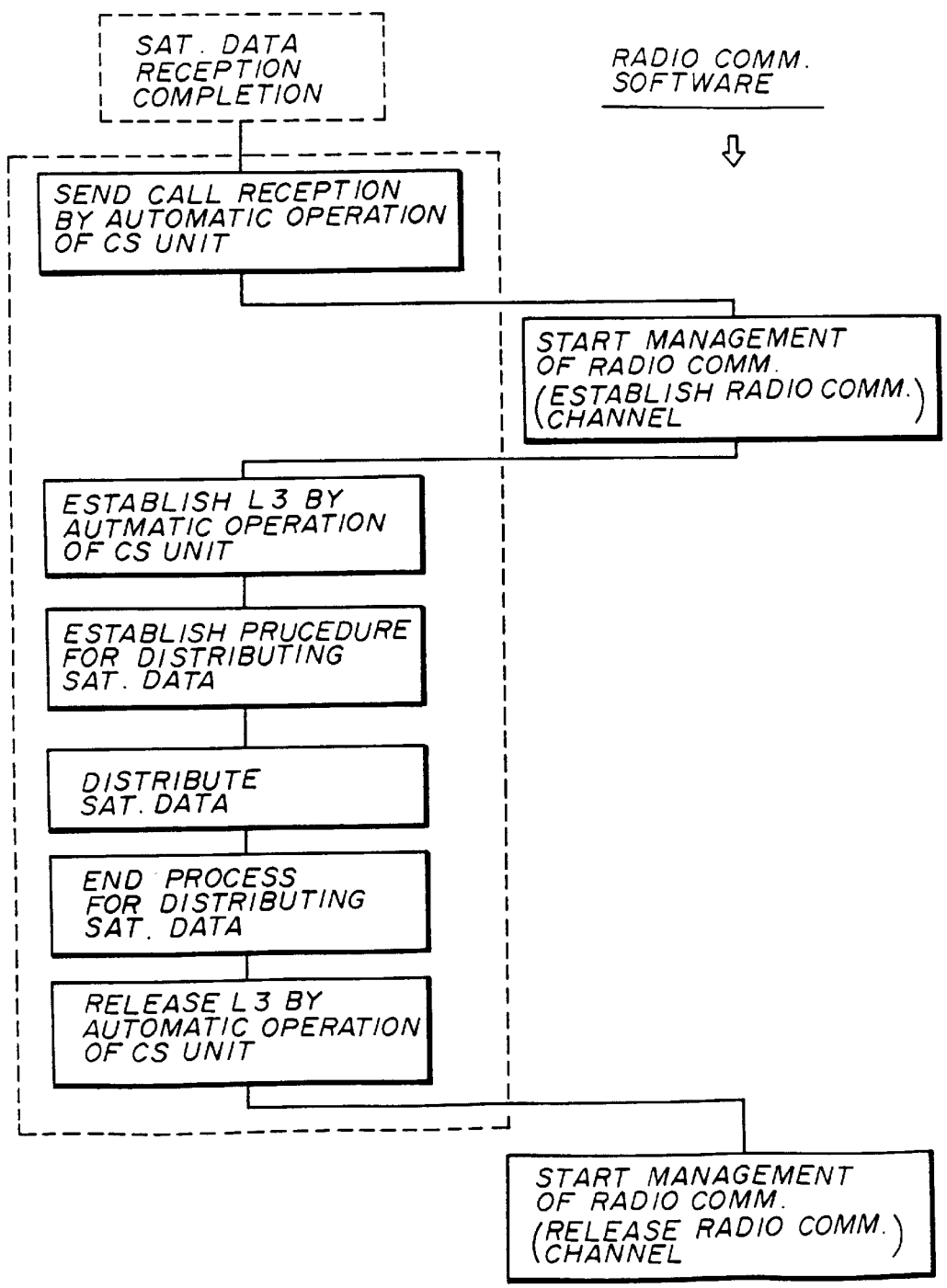
FIG. 21 is a flowchart of a management process for a call connection which is added to achieve the satellite data distribution system according to the present invention.
Figure 22:
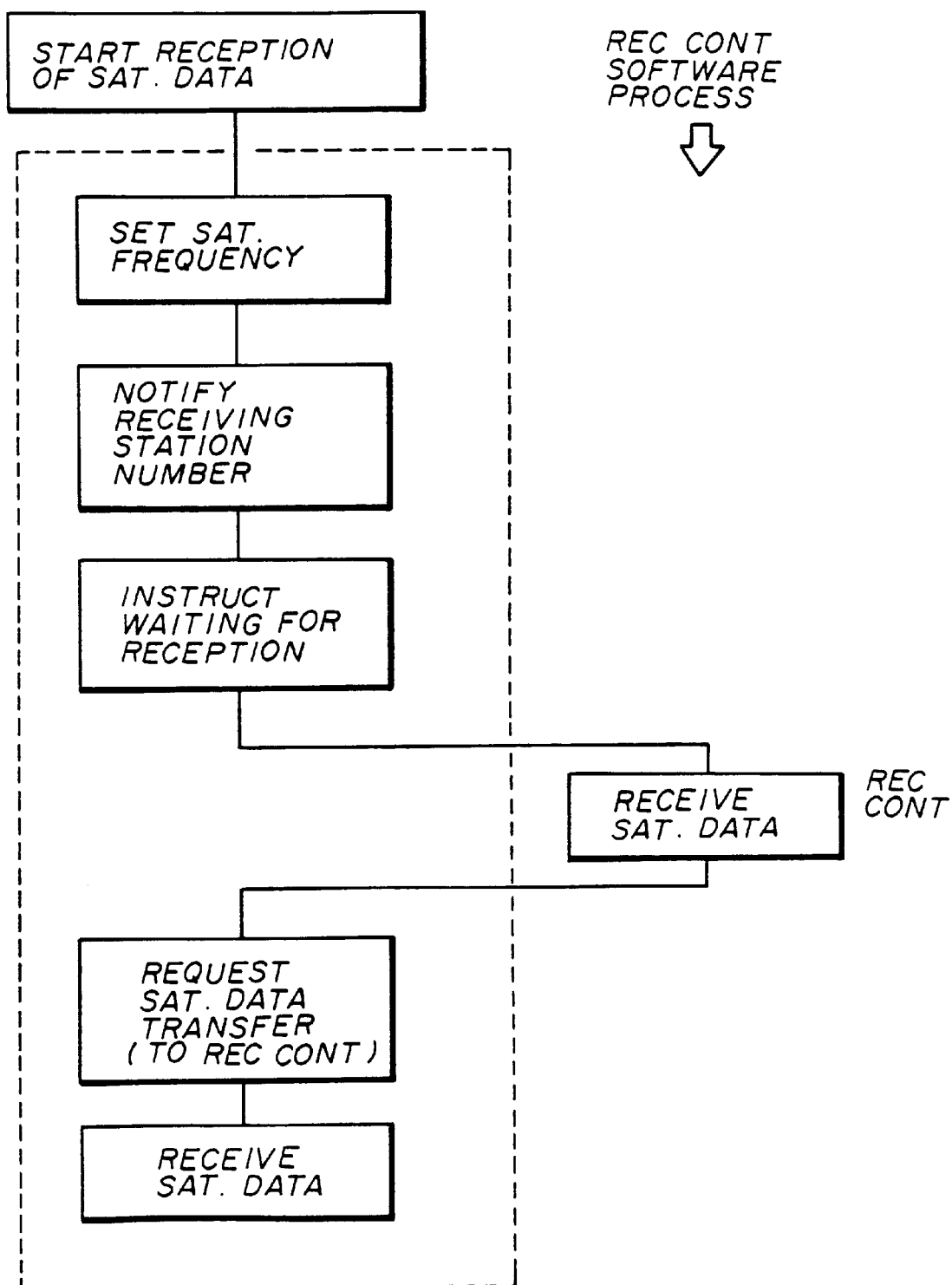
FIG. 22 is a flowchart of a satellite data reception process which is added to achieve the satellite data distribution system according to the present invention.
Figure 23:
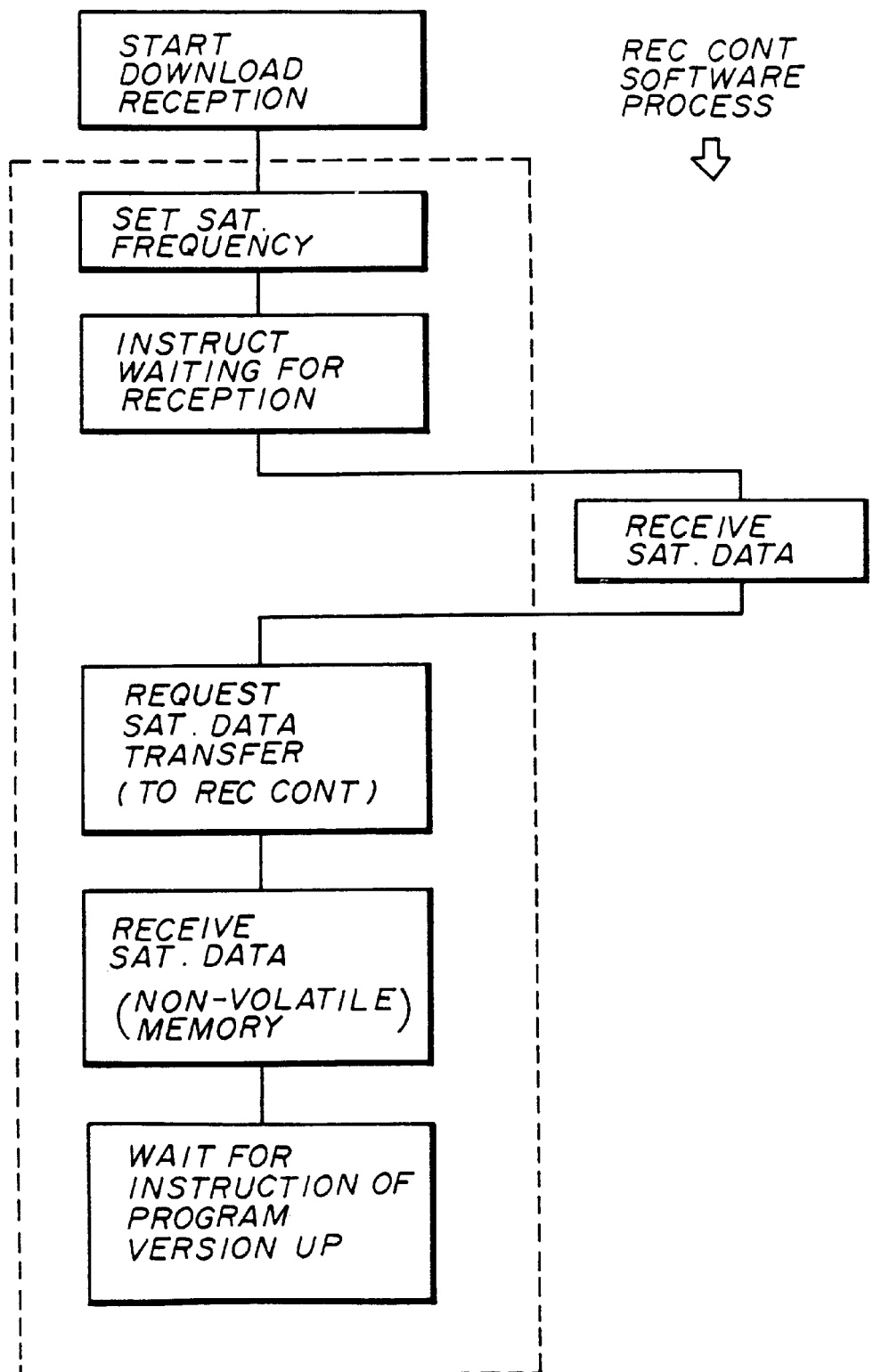
FIG. 23 is a flowchart of a download reception process which is added to achieve the satellite data distribution system according to the present invention.

FIG. 21 is a flowchart of a management process for a call connection which is added to achieve the satellite data distribution system according to the present invention. FIG. 22 is a flowchart of a satellite data reception process which is added to achieve the satellite data distribution system according to the present invention. FIG. 23 is a flowchart of a download reception process which is added to achieve the satellite data distribution system according to the present invention.

A description will now be given of a structure of the software provided to achieve the satellite data distribution system according to the present invention. In the following description, italic portions correspond to the software added to support the satellite data distribution system according to the present invention, and parenthesized parts correspond to the software which may be deleted when the satellite data distribution system is supported.

(1) Boot ROM Section
  a) IPL process performs initialization to boot the application software.
  b) Self-Diagnosis checks whether the system can perform a normal operation during the initialization process.
(2) OS Section manages the order of various programs and controls the microprocessor according to a scheduler function.
(3) Radio IO Management Section
  a) Radio data Tx/Rx process performs transfer of transmission/reception data to the subscriber unit with the application process section.
  b) Link channel control process performs a layer 2 (L2) process for a radio communication unit.
  c) Tx/Rx monitor control process monitors and controls the transmission/reception unit, and manages operation timings thereof.
  d) Line quality monitor process monitors the quality of transmission/reception data.

(4) Application Process Section
   a) Maintenance control performs maintenance operations of the CS unit.
   b) Monitor control controls monitoring of the CS unit.
   c) Download control downloads application programs by remote loading method.
   d) Initialization control controls various factors when power is turned on.
   e) Idle control receives occurrences of various events.
   f) Call connection management process performs layer 3 (L3) management of the radio unit, and performs layer 3 (L3) management of interface with the network
   g) Call connection management (automatic process) performs automatic call to the subscriber unit after reception of satellite distribution data. mainly manages automatic call of the layer 3 of the radio communication unit.
   h) Satellite data reception control process manages the distribution data from the satellite.
   i) Radio unit L3 management manages layer 3 (L3) of the radio communication.
   j) Network L3 management manages layer 3 (L3) of the interface with the network.
(5) Network IO Management Section
   a) Network data Tx/Rx process performs transmission/reception of data with the network
   b) Link channel control process performs layer 2 (L2) process of the interface with the network.
   c) (Download reception process) performs transmission/reception of data when downloading is performed with the network. This function is not necessary when downloading is performed with the satellite distribution.
(6) Satellite IO management section (This section is added when the satellite data reception unit is connected to the CS unit.)
   a) Download reception process performs transmission/reception of data when downloading is performs with the satellite.

The above-mentioned software is stored in the system data memory 15h of the base station unit shown in FIG. 17. The software may be stored in other recording medium such as a ROM or a disk. The storage of the software in a recording medium is included in the scope of the present invention.

Figure 24:
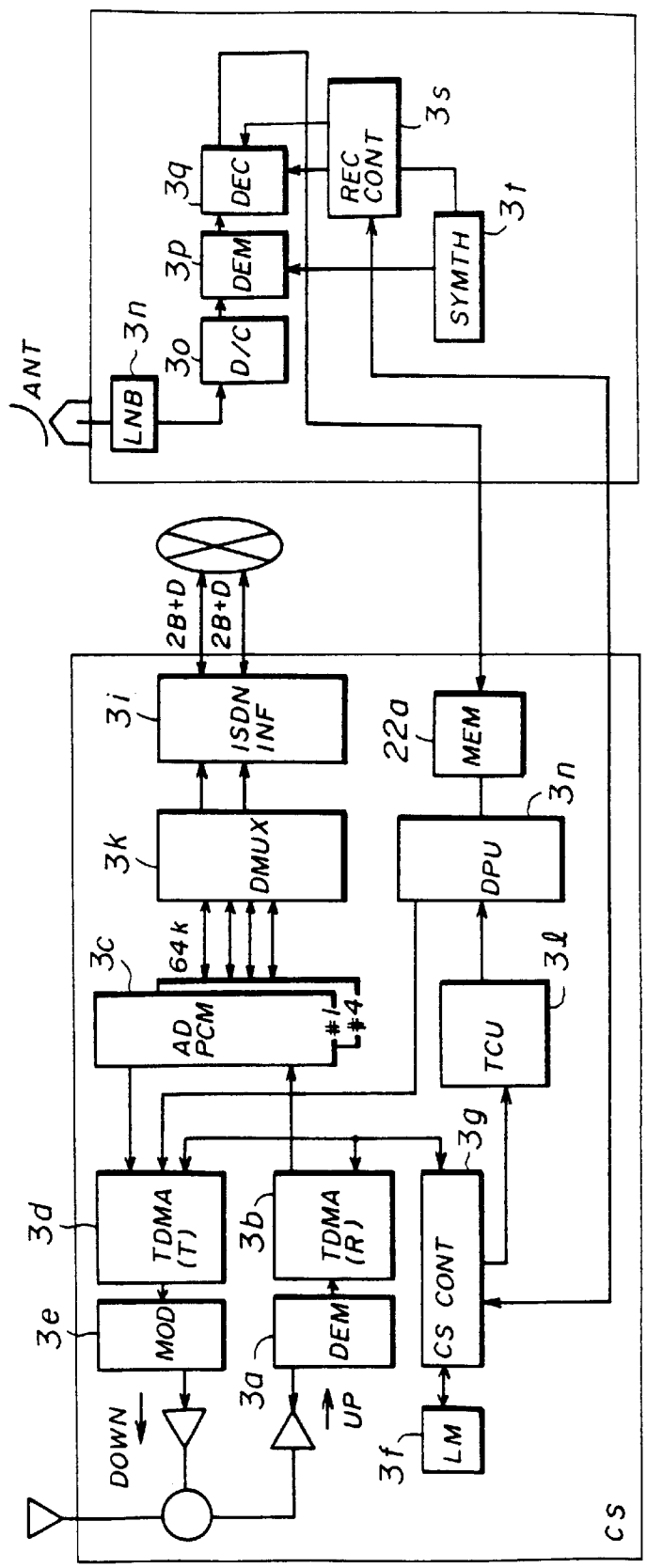
FIG. 24 is a block diagram of a base station unit for a mobile communication system used for a satellite data distribution system according to a second embodiment of the present invention.

A description will now be given of a second embodiment of a satellite data distribution system according to the present invention. FIG. 24 is a block diagram of a base station unit for a mobile communication system used for a satellite data distribution system according to the second embodiment of the present invention. In FIG. 24, parts that are the same as the parts shown in FIG. 3 are given the same reference numerals, and descriptions thereof will be omitted.

The base station unit shown in FIG. 24 differs from the base station unit shown in FIG. 3 in that the memory 3r, which is provided in the satellite data reception unit 30-2 to store the distribution data from the satellite 1, is omitted and instead a memory (MEM) 22a is provided in the CS unit 30-1. Other structures and operation of the satellite data distribution system according to the present embodiment is the same as that of the satellite data distribution system according to the above-mentioned first embodiment.

Figure 25:
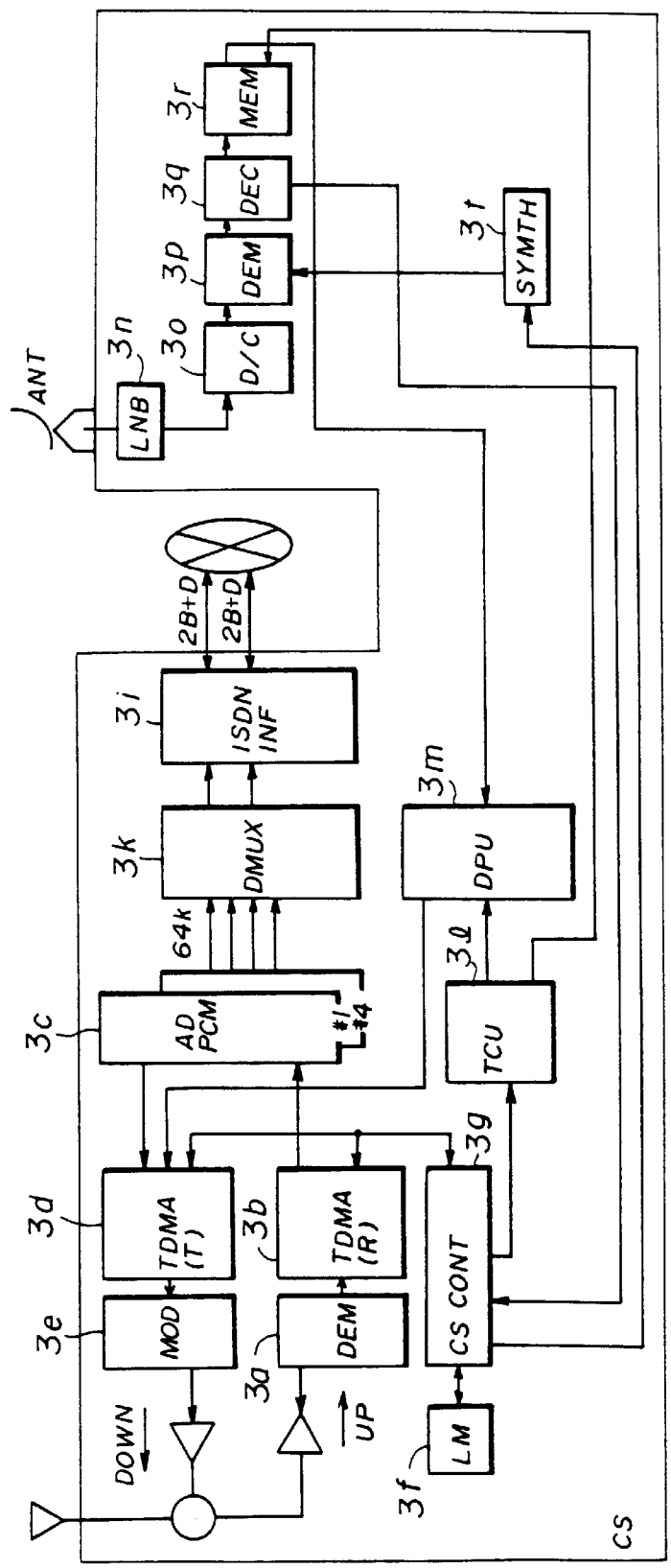
FIG. 25 is a block diagram of a base station unit for a mobile communication system used for a satellite data distribution system according to a third embodiment of the present invention.

A description will now be given of a third embodiment of a satellite data distribution system according to the present invention. FIG. 25 is a block diagram of a base station unit for a mobile communication system used for a satellite data distribution system according to the third embodiment of the present invention. In FIG. 25, parts that are the same as the parts shown in FIG. 3 are given the same reference numerals, and descriptions thereof will be omitted.

The base station unit shown in FIG. 25 differs from the base station unit shown in FIG. 3 in that a part of the hardware, which includes the D/C 3o, the demodulator 3p, the decoder 3q, the memory 3r and the synthesizer 3t, is accommodated in the housing of the CS unit 30-1 and the function of the record controller 3s of the satellite data reception unit 30-2 is preformed by the record controller 3g of the CS unit. Other structures and operation of the satellite data distribution system according to the present embodiment are the same as that of the satellite data distribution system according to the above-mentioned first embodiment. According to the present embodiment, the size of the base station unit of the mobile communication system user in the satellite data distribution system is further reduced.

Figure 26:
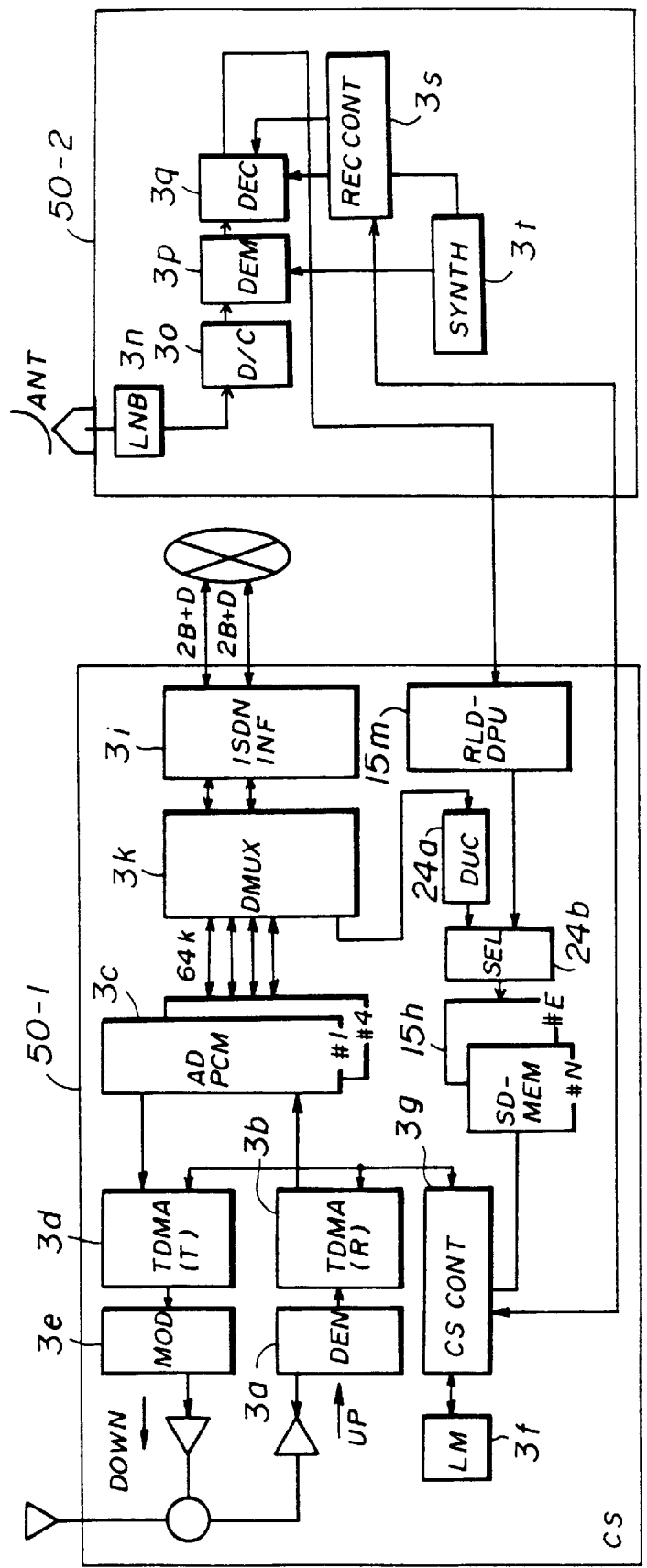
FIG. 26 is a block diagram of another example of the base station unit of the mobile communication system having a remote loading function.

A description will now be given another example of the remote loading system which uses the satellite data distribution system according to the present invention. FIG. 26 is a block diagram of another example of the base station unit of the mobile communication system having a remote loading function shown in FIG. 17. In FIG. 26, parts that are the same as the parts shown in FIG. 17 are given the same reference numerals, and descriptions thereof will be omitted.

The base station unit shown in FIG. 26 is provided with the a data conversion unit (DCU) 24a and a selection unit (SEL) 24b in the CS unit 50-1. The data conversion unit 24a receives the loading data, which may be an application software, from the ground network similar to the CS unit provided in the conventional PHS mobile communication system. The data conversion unit 24a converts the format of the received loading data into a format used for the loading data distributed from the satellite 1. The selection unit 24b selects one of the loading data form the network and the loading data from the satellite 1. Other structures and operations are the same as that of the base station unit shown in FIG. 17.

In the base station unit shown in FIG. 26, the loading data from the network and the loading data from the satellite are stored in the same system data memory 15h. This increases reliability of the loading function for the application software.

The present invention is not limited to the specifically disclosed embodiments, and variations and modifications may be made without departing from the scope of the present invention. In the claims, means-plus-function clause are intended to cover the structures described herein as performing the recited function and not only structural equivalents but also equivalent structures.

What is claimed is:

1. A data distribution method for distributing data to a plurality of subscribers of a data distribution system via a satellite, said data distribution system including a mobile communication system having a base station unit communicating with said subscribers located within a communicable range according to a point-to-multipoint communication and a host center, said data distribution method comprising the steps of:

transmitting a distribution request from a subscriber to said base station unit;

sending the distribution request from said base station unit to said host center via said mobile communication system;

transmitting data to be distributed from said host center to said satellite in response to said distribution request;

distributing said data from said satellite to said base station unit which received said distribution request;

receiving said data at said base station unit; and distributing said data from said base station unit to said subscriber which transmitted said distribution request.

2. The data distribution method as claimed in claim 1, wherein the step of transmitting data includes the step of:

transmitting said data from said host center to said base station unit via said satellite in response to said distribution request from one of said subscribers.

3. The data distribution method as claimed in claim 1, wherein the step of sending the distribution request comprises the step of:

sending a closing request to said mobile communication system for requesting closing of a communication channel used for distributing said data while said data is being distributed to said subscriber after said distribution request from said subscriber is confirmed in said base station unit.

4. The data distribution method as claimed in claim 1, wherein the step of sending the distribution request comprises the step of:

setting a reception frequency in said base station unit for receiving said data from said satellite after confirming said distribution request from said subscriber during a communication between said subscriber and said host center.

5. The data distribution method as claimed in claim 4, wherein the step of sending the distribution request further comprises the step of:

transferring information from said subscriber to said base station unit, the information including said reception frequency and a subscriber number of said subscriber.

6. The data distribution method as claimed in claim 5, wherein the step of distributing said data from said base station unit to said subscriber, comprises the steps of:

automatically making a call from said base station unit to said subscriber based on said information transferred in the transferring information step; and automatically disconnecting a connection between said base station unit and said subscriber after said data is distributed from said base station unit to said subscriber.

7. The distribution method as claimed in claim 1, further comprising the step of:

sending to said subscriber a message indicating that a distribution of said data is unable when said data is not received from said satellite within a predetermined time period after said distribution request is sent from said subscriber.

8. The method as in claim 1, wherein said host center and said base station are interconnected through a ground network, and further comprising the step of:

sending the distribution request from said one of said subscribers to said host center through said ground network, said distribution request requesting distribution of said data.

9. A base station unit of a mobile communication system used in a data distribution system for distributing data from a host center to a plurality of subscribers of the data distribution system via a satellite, said base station unit comprising:

a communication processing unit for connecting said subscribers located within a communicable range to said mobile communication system according to a point-to-multipoint communication and for sending a distribution request received from a subscriber unit to said host center;

a satellite data reception unit for receiving said data sent by said satellite in response to said distribution request; and a distribution processing unit for distributing said data received by said satellite data reception unit, said data being distributed to said subscribers via said communication processing unit.

10. A base station unit of a mobile communication system used in a data distribution system for distributing data from a host center to a plurality of subscribers of the data distribution system via a satellite, said base station unit comprising:

a communication processing unit for connecting said subscribers located within a communicable range to said mobile communication system according to a point-to-multipoint communication, and for sending a distribution request received from a subscriber unit to said host center; and a distribution processing unit connectable to a satellite data reception unit for receiving said data sent by said satellite in response to said distribution request, said distribution processing unit distributing said data received by said satellite data reception unit, said data being distributed to said subscribers via said communication processing unit.

11. The base station unit as claimed in claim 10, further comprising a data throughput control unit controlling throughput of said data when said data is received by said satellite data reception unit.

12. The base station unit as claimed in claim 10, wherein said communication processing unit has a channel exclusive for distributing said data received by said satellite data reception unit to said subscribers.

13. The base station unit as claimed in claim 10, wherein said communication processing unit comprises a channel assignment control unit for flexibly assigning one of a plurality of communication channels to distribute said data to said subscribers in response to a condition of use of the communication channels.

14. The base station unit as claimed in claim 10, wherein said communication processing unit comprises a channel control unit which sends a close request for closing one of a plurality of communication channels used for distributing said data while said data is being distributed to said subscribers, said close request being sent to said mobile communication system after a distribution request from one of said subscribers is confirmed, said distribution request requesting distribution of said data to said one of said subscribers.

15. The base station unit as claimed in claim 10, wherein said communication processing unit comprises a frequency control unit which sets a reception frequency of said satellite data reception unit upon confirmation of reception of a distribution request during communication between one of said subscribers sending a distribution request and a center station of said satellite data distribution system, said distribution request requesting for distributing said data to said one of said subscribers.

16. The base station unit as claimed in claim 15, wherein said communication processing unit further comprises a reception control unit which receives information from said one of said subscribers during a communication between said on of said subscribers and said center station of said satellite data communication system, said information including the reception frequency and a subscriber number of said one of said subscribers.

17. The base station unit as claimed in claim 16, wherein said communication processing unit further comprises a disconnection control unit which automatically disconnects a connection between said base station unit and said one of said subscribers after distributing said data to said one of said subscribers by automatically calling said one of said subscribers based on said subscriber number included in said information.

18. The base station unit as claimed in claim 10, further comprising a packet processing unit for converting said data into packet data when said data received from said satellite is transmitted to said subscribers.

19. The base station unit as claimed in claim 10, further comprising a message control unit which sends an unable message to one of said subscribers requesting for distribution of said data when said data is not received within a predetermined time period after a distribution request is received from said one of said subscribers, said unable message indicating that said data cannot be distributed from said base station unit, said distribution request requesting for distribution of said data to said one of said subscribes.

\* \* \* \* \*